(12) United States Patent
Ono et al.

(10) Patent No.: US 6,627,099 B2
(45) Date of Patent: Sep. 30, 2003

(54) ELECTROLYTE COMPOSITION AND ELECTROCHEMICAL BATTERY USING THE SAME

(75) Inventors: Michio Ono, Kanagawa (JP); Koji Wariishi, Kanagawa (JP); Takayasu Yasuda, Kanagawa (JP); Chang-yi Qian, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 192 days.

(21) Appl. No.: 09/933,716

(22) Filed: Aug. 22, 2001

(65) Prior Publication Data
US 2002/0055046 A1 May 9, 2002

(30) Foreign Application Priority Data

Aug. 22, 2000 (JP) ........................................ 2000-250828
Aug. 20, 2001 (JP) ........................................ 2001-248879

(51) Int. Cl.⁷ ..................... H01M 10/40; H01M 14/00; H01L 31/04
(52) U.S. Cl. ................... 252/62.2; 252/399.3; 429/199; 429/200; 429/306; 429/324; 429/347; 136/252; 136/243; 136/254; 136/263
(58) Field of Search ............................. 252/62.2, 299.3; 429/199, 324, 200, 347, 306; 136/252, 243, 254, 263

(56) References Cited

U.S. PATENT DOCUMENTS

| | | | | |
|---|---|---|---|---|
| 6,171,522 B1 | * | 1/2001 | Michot et al. | ............. 252/500 |
| 6,254,797 B1 | * | 7/2001 | Michot et al. | ............. 252/62.2 |
| 6,495,067 B1 | * | 12/2002 | Ono | ............. 252/299.61 |
| 2002/0034690 A1 | * | 3/2002 | Ono | ............. 429/306 |

FOREIGN PATENT DOCUMENTS

| | | |
|---|---|---|
| JP | 04-019903 | 1/1992 |
| JP | 04-323260 | 11/1992 |
| JP | 11-086629 | 3/1999 |
| JP | 2000-111860 | 4/2000 |

* cited by examiner

Primary Examiner—C. Melissa Koslow
(74) Attorney, Agent, or Firm—Burns, Doane, Swecker & Mathis, LLP

(57) ABSTRACT

An electrolyte composition which is excellent in durability and charge transport performance, and an electrochemical battery in which deterioration of the charge transport performance with time is minimized, the electrolyte composition including therein a salt which comprises an anion which contains a mesogen group, and an alkyl or alkenyl group having 6 carbons or more in the structure of the anion, and an organic or inorganic cation.

14 Claims, 2 Drawing Sheets

ELECTROLYTE COMPOSITION AND ELECTROCHEMICAL BATTERY USING THE SAME

BACKGROUND OF THE INVENTION

1. Field of the Invention

The present invention relates to a novel electrolyte composition and an electrochemical battery using the same. More particularly, the present invention relates to a non-aqueous secondary battery and a photoelectric chemical battery.

2. Description of the Related Art

The electrolyte used in an electrochemical battery such as a non-aqueous secondary battery or a dye sensitized battery, contains ions which are selected in accordance with the purpose of the battery. The electrolyte is a medium which functions to transport these ions between electrodes, and this function is referred to as "ion conductivity". For example, a lithium secondary battery, which is a typical non-aqueous secondary battery, has a problem pertaining to the transportation of a lithium ion, while a dye-sensitizing solar battery has a problem pertaining to the conductivity of an iodide ion or an iodide trimer ion. In such batteries, generally, as electrolytes, there are used many solution systems having high ion conductivity. However, a problem arises that, due to depletion or leakage of a solvent when it is contained in a battery, durability of the battery may deteriorate. Further, in the lithium secondary battery, since a metallic container must be used to seal a solution therein, the weight of a battery becomes heavier, and it becomes difficult to provide a battery which has a high degree of freedom with respect to configuration.

Recently, in order to overcome such drawbacks concerning a solution system electrolyte, there have been proposed a variety of electrolytes. For example, a so-called gel electrolyte in which the solution system electrolyte is soaked in a polymer matrix is more advantageous as compared to the solution system electrolyte in that deterioration of ion conductivity of the gel electrolyte is reduced so that battery performance does not deteriorate. However, the gel electrolyte is not able to completely inhibit volatilization of a solvent, thereby can not completely solve problems concerning the solution system electrolyte. Further, a polymer electrolyte having a salt dissolved in a polymer such as a polyethylene oxide was expected to solve such a problem described above. However, ion conductivity of the polymer electrolyte is still insufficient. On the other hand, an imidazolium salt or a pyridinium salt having $BF_4^-$ or $(CF_3SO_2)_2N^-$ and the like as a counter anion, is a room temperature molten salt which is liquefied at room temperature, and these salts have been proposed as electrolytes for a lithium ionic battery. However, the mechanical strength and ion conductivity of the electrolyte have an inverse relationship with each other. Therefore, when the mechanical strength is increased by increasing the viscosity of the molten salt itself or by including a polymer therein, ion conductivity of the electrolyte may deteriorate. Further, in such an electrolyte described above, ion conductivity largely depends on temperature, and is insufficient particularly at a low temperature.

In solar power generation in which light energy is converted to electric energy, a single crystal silicon solar battery, a polycrystalline silicon solar battery, an amorphous silicon solar battery, and a compound solar battery such as cadmium telluride or indium copper selenide have been used for practical purposes or for research and development. However, in order to use such solar batteries in general, problems with respect to manufacturing cost, availability of a raw material, duration of an energy payback time, and the like must be solved. On the other hand, there has been proposed a large number of solar batteries in which organic materials are used to increase size or reduce cost. However, a problem arises that energy conversion efficiency is low and durability is poor.

Under such circumstances, in "Nature" (volume No. 353, pages 737 to 740, in 1991), U.S. Pat. No. 4,927,721, and the like, there are disclosed technologies regarding a photoelectric conversion element which uses an oxide semiconductor which was sensitized by a dye (abbreviated to a "dye-sensitized photoelectric conversion element" hereinafter) and a photoelectric chemical battery using the same. The batteries disclosed above are formed by a photoelectric conversion element which functions as a negative electrode, a charge transport layer, and a counter electrode. The aforementioned photoelectric conversion element is formed by an electric conductive support and a photosensitive layer, which photosensitive layer includes a semiconductor having a dye adsorbed on the surface thereof. The aforementioned charge transport layer is formed by an oxidation reductant, which is responsible for charge transportation between a negative electrode and a counter (positive) electrode. A battery made by this method is favorable in that they are inexpensive and they can provide a relatively high energy conversion efficiency (i.e., photoelectric conversion efficiency). However, because an aqueous solution (i.e., electrolyte solution) using a salt such as potassium iodide as an electrolyte is used as a charge transport layer, long-term use of this battery causes the electrolyte to transpire and thus become depleted, thereby causing a problem in that the photoelectric conversion efficiency deteriorates noticeably or the battery no longer functions as a battery.

In order to solve this problem, WO95/18456 discloses a method in which depletion of an electrolyte solution is prevented by using an imidazolium salt i.e., a low molten compound as an electrolyte. Through this method, since water or an organic solvent which has been conventionally used as a solvent for an electrolyte becomes unnecessary or since it is sufficient to use only a small amount thereof, durability of the electrolyte is improved. However, the durability is still insufficient for practical use. Further, when the concentration of the imidazolium salt is increased, there arise problems in that the viscosity increases, the charge transport performance deteriorates, and the photoelectric conversion efficiency thereby decreases. Moreover, although there has been provided a method using a triazolium salt as an electrolyte, there arises a problem similar to that of the imidazolium salt.

SUMMARY OF THE INVENTION

In a conventional electrochemical battery, when an electrolyte composition containing a low molecular solvent was used, there was a problem of durability in that the solvent volatilizes or leaks to thereby deteriorate battery performance. On the other hand, when a salt-based electrolyte which is liquefied at room temperature i.e., a so-called molten salt electrolyte was used, since this electrolyte does not contain a low boiling point compound, it is effective in preventing deterioration of the battery performance due to volatilization. However, there is a drawback in that, since viscosity of the electrolyte is generally high, charge transport performance thereof is low.

In view of the aforementioned problems, an object of the present invention is to provide an electrolyte composition that is excellent in durability and charge transport performance. Further, another object of the present invention is to provide an electrochemical battery in which deterioration of the battery performance with time is minimized.

Means for solving the aforementioned problems are described below:

A first aspect of the present invention is an electrolyte composition that includes a salt therein, the salt comprising: an anion which contains a mesogen group and an alkyl or alkenyl group having 6 carbons or more in the structure thereof; and an organic or inorganic cation.

A second aspect of the present invention is: an electrolyte composition that includes a salt therein, the salt comprising: an anion which contains a mesogen group, and an alkyl or alkenyl group having 6 carbons or more in the structure thereof; and an organic or inorganic cation, wherein the mesogen group is represented by the following formula (1):

(1)

wherein $Y_{11}$ represents a bivalent 4 to 7-membered ring group or a condensed ring group formed thereof, $Q_{12}$ and $Q_{13}$ independently represent a bivalent linking group or a single bond, n represents 1, 2 or 3, and when n is 2 or 3, a plurality of $Y_{11}$, $Q_{12}$, and $Q_{13}$ respectively may be the same or different.

A third aspect of the present invention is an electrolyte composition that includes a salt therein, the salt comprising: an anion which contains a mesogen group and an alkyl or alkenyl group having 6 carbons or more in the structure thereof; and an organic or inorganic cation, wherein the mesogen group is represented by the following formula (1):

(1)

wherein $Y_{11}$ represents a bivalent 4 to 7-membered ring group or a condensed ring group formed thereof, each of $Q_{12}$ and $Q_{13}$ represents a bivalent linking group or a single bond, n represents 1, 2 or 3, and when n is 2 or 3, a plurality of $Y_{11}$, $Q_{12}$, and $Q_{13}$ respectively may be the same or different, and said salt is represented by the following formula (2):

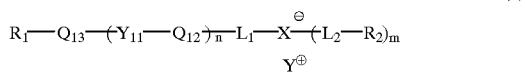

(2)

wherein $Y_{11}$ represents a bivalent 4 to 7-membered ring group, or a condensed ring group formed thereof, $Q_{12}$ and $Q_{13}$ independently represent a bivalent linking group or a single bond, n represents 1, 2 or 3, and when n is 2 or 3, a plurality of $Y_{11}$ and $Q_{12}$ respectively may be the same or different; $R_1$ represents a substituted or unsubstituted alkyl or alkenyl group having 6 carbons or more, $L_1$ and $L_2$ independently represent a bivalent linking group or a direct bond, $R_2$ represents a substituent group, m represents 0 or 1, $X^-$ represents an anionic group, and $Y^+$ represents an organic or inorganic cation.

A fourth aspect of the present invention is an electrolyte composition in which the cation is an organic cation.

A fifth aspect of the present invention is an electrolyte composition in which the cation is a lithium cation.

A sixth aspect of the present invention is an electrolyte composition, wherein the anion includes an anionic group in which hydrogen is dissociated from at least one selected from groups such as a sulfonamide group, a disulfonimide group, an N-acylsulfonamide group, a carboxylic acid group, a sulfonic acid group, a hydroxyl group, an active methylene group, and an active methine group.

A seventh aspect of the present invention is an electrolyte composition, wherein at least one of the anion and the cation includes in the structure thereof a group represented by the following formula (3):

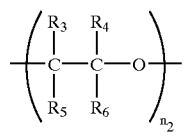

(3)

wherein $R_3$, $R_4$, $R_5$, and $R_6$ independently represent a hydrogen atom or a substituted or unsubstituted alkyl group, and $n_2$ represents any integer from 1 to 20.

An eighth aspect of the present invention is an electrolyte composition that includes further a salt therein, the salt comprising an cation which contains a mesogen group and an alkyl or alkenyl group having 6 carbons or more in the structure thereof and a freely selected anion.

A nineth aspect of the present invention is an electrolyte composition, wherein at least one of the anion and the cation includes a polymerizable group in the structure thereof.

A tenth aspect of the present invention is an electrolyte composition, wherein at least one of the anion and the cation is a high polymer.

An eleventh aspect of the present invention is an electrolyte composition which contains an iodine salt compound and iodine.

A twelfth aspect of the present invention is an electrochemical battery which includes the aforementioned electrolyte composition.

A thirteenth aspect of the present invention is an electrochemical battery which comprises a charge transport layer which includes said electrolyte composition, a photosensitive layer which includes a semiconductor sensitized by a dye, and a counter electrode, and which is a photoelectric chemical battery.

A fourteenth aspect of the present invention is an electrochemical battery in which the electrochemical battery is a non-aqueous secondary battery.

DESCRIPTION OF THE PREFERRED EMBODIMENT

[Electrolyte Composition]

Figure 1:
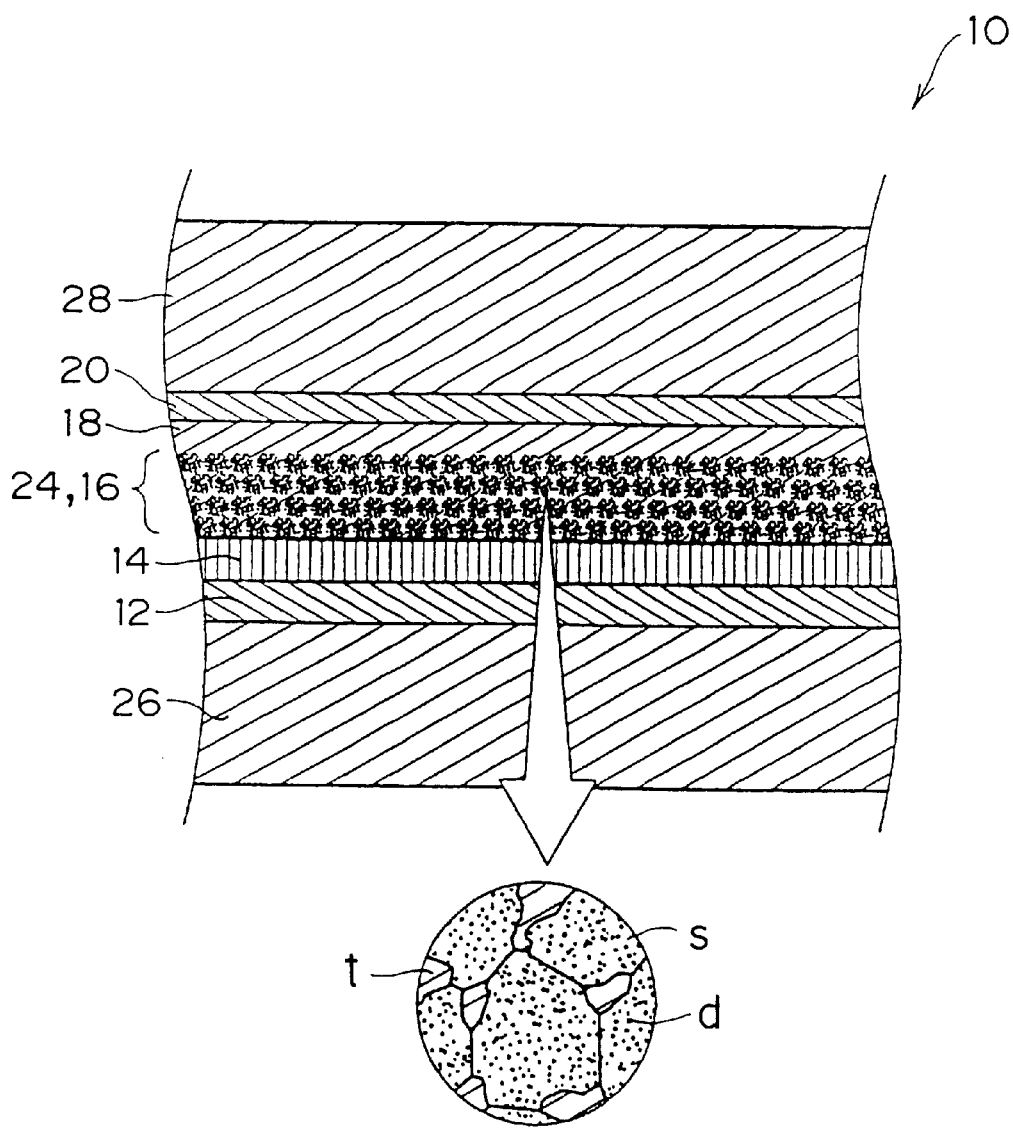
FIG. 1 is a partial cross-sectional view illustrating the structure of a photoelectric conversion element according to a preferred embodiment of the present invention.

An electrolyte composition of the present invention includes therein a salt that comprises an anion which contains a mesogen group and an alkyl or alkenyl group having 6 carbons or more in the structure thereof, and an organic or inorganic cation. Generally, there has been provided a salt which is a liquid liquefied at the temperature of 25° C. or which is a solid molten at a low temperature i.e., a compound called a molten salt. Such a compound, which has a high boiling point and which is not easily depleted, is favorable as compared to a low molecular solvent contained in a solvent electrolyte. On the contrary, since the molten salt has a high viscosity, there has been a problem in that the charge transport performance of the molten salt is lower than that of the solvent electrolyte. Since the electrolyte composition of the present invention that contains the aforementioned salt can exhibit a high charge transport performance even in a state in which the salt has a high viscosity, the present invention can maintain the charge transport performance, and has an excellent durability. Therefore, when the electrolyte composition of the present invention is used as an electrolyte for an electrochemical battery, there can be provided an electrochemical battery in which deterioration of the charge transport performance with time is minimized and which is excellent in durability.

A "mesogen group" refers to an atomic group which forms a liquid crystal coposing element, and a typical one contains a cyclic structure (preferably, a plurality of cyclic structures) which is connected through a bonding group or a linking group. Examples of the mesogen group are described in "Flussige Kristalle in Tabellen II", Dietrich Demus and Horst Zaschke, 7–18 (1984). "Among them, a group represented by the following formula (1) is preferable:

(1)

In formula (1), $Q_{12}$ and $Q_{13}$ independently represent a bivalent linking group or a single bond. Preferable examples of the bivalent linking group include: —CH=CH—, —CH=N—, —N=N—, —N(O)=N—, —COO—, —COS—, —CONH—, —COCH$_2$—, —CH$_2$CH$_2$—, —OCH$_2$—, —CH$_2$NH—, —CH$_2$—, —CO—, —O—, —S—, —NH—, —(CH$_2$)$_k$—(k is any integer from 1 to 3 and the same definition applies hereinafter), and —CH=CH—COO—, —CH=CH—CO—, and —(C≡C)$_k$—or a combination thereof. —CH$_2$—, —CO—, —O—, —CH=CH—, —CH=N—, and —N=N—or a combination thereof are more preferable. Further, among these, those in which hydrogen atoms are substituted are used. Preferably, each of $Q_{12}$ and $Q_{13}$ is a single bond.

In formula (1), $Y_{11}$ represents a bivalent 4 to 7-membered ring group, or a condensed ring group which is structured thereof. Specifically, $Y_{11}$ is preferably a bivalent 6-membered ring aromatic group, a 4 to 6-membered ring saturated or unsaturated fatty acidic group, 5 or 6-membered ring heterocyclic ring, or a condensed ring group thereof. Preferable examples of $Y_{11}$ are represented by the following formulae (Y-1) to (Y-28). Further, a bivalent group formed by combining the groups represented by these formulae is also preferable.

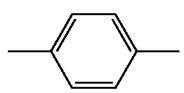

(Y-1)

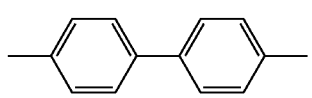

(Y-2)

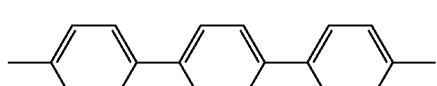

(Y-3)

-continued

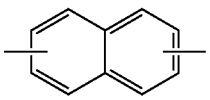

(Y-4)

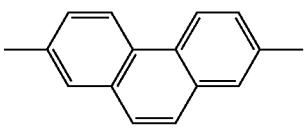

(Y-5)

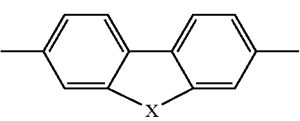

(Y-6)

X = CH$_2$, O, CO, NH

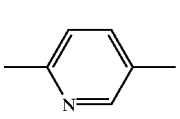

(Y-7)

(Y-8)

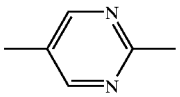

(Y-9)

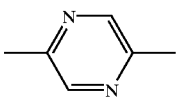

(Y-10)

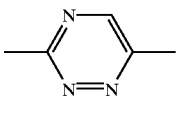

(Y-11)

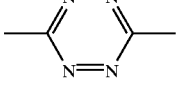

(Y-12)

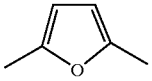

(Y-13)

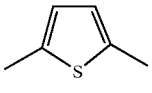

(Y-14)

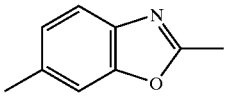

(Y-15)

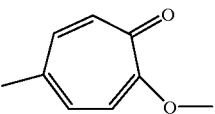

(Y-16)

-continued

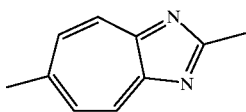 (Y-17)

 (Y-18)

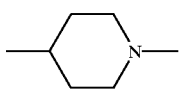 (Y-19)

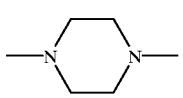 (Y-20)

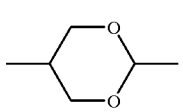 (Y-21)

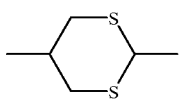 (Y-22)

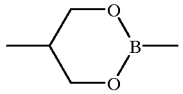 (Y-23)

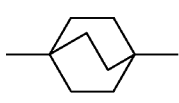 (Y-24)

 (Y-25)

 (Y-26)

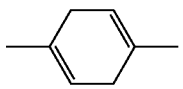 (Y-27)

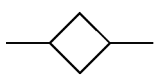 (Y-28)

Among the formulae (Y-1) to (Y-28), (Y-1), (Y-2), (Y-18), (Y-19), (Y-21), and (Y-22) are preferable, and (Y-1), (Y-2), and (Y-21) are more preferable.

In the formula (1), n represents 1, 2 or 3, and when n is 2 or 3, a plurality of $Y_{11}$, $Q_{12}$ and $Q_{13}$ may be the same or different.

An alkyl or alkenyl group, having 6 carbons or more and contained in the aforementioned anion, preferably has 25 carbons or less, and more preferably from 6 to 18 carbons. Further, the alkyl group and the alkenyl group can independently have a substituent group. Preferable examples of the substituent group include: a substitutable alkyl group [whose number of carbon atoms (which is referred to as C number hereinafter) is preferably 1 to 24, more preferably 1 to 10, and whose chain may be linear or branched, and examples of which include: methyl, ethyl, propyl, butyl, i-propyl, i-butyl, pentyl, hexyl, octyl, 2-ethylhexyl, t-octyl, decyl, dodecyl, tetradecyl, 2-hexyldecyl, hexadecyl, octadecyl, cyclohexylmethyl, and octylcyclohexyl]; a substitutable and condensable allyl group (whose C number is preferably 6 to 24 and examples of which include: phenyl, 4-methylphenyl, 3-cyanophenyl, 2-chlorophenyl, and 2-naphtyl); a substitutable and condensable heterocyclic group (in the case of a nitrogen containing heterocyclic group, nitrogen in the ring of which may be quaternarized, and whose C number is preferably 2 to 24, and examples of which include: 4-pyridyl, 2-pyridyl, 1-octylpyridynium-4-il, 2-pyrimidyl, 2-imidazolyl, and 2-chiazolyl); an alkoxy group [whose C number is preferably 1 to 24, and examples of which include: methoxy, ethoxy, butoxy, octyloxy, methoxyethoxy, methoxypenta (ethyloxy), acryloyloxyethoxy, and pentafluoropropoxy]; an acyloxy group (whose C number is preferably 1 to 24, and examples of which include acetyloxy and benzoiloxy); an alkoxycarbonyl group (whose C number is preferably 2 to 24, and examples of which include methoxycarbonyl and ethoxycarbonyl); a cyano group; a fluoro group; an alkoxycarbonyl group; and a cyano group and a polymerizable group (preferable examples thereof include a vinyl group, an acryloyl group, a methacryloyl group, a styryl group, and a cinnamic acid residue).

Preferably, the alkyl group or the alkenyl group is unsubstituted or, as a substitution group, it has a polymerizable group (more preferably, an acryloyl group or a methacryloyl group) as the terminal group.

Preferably, an anion for constituting the aforementioned salt includes an anionic group in which hydrogen is dissociated from at least one group selected from groups of a sulfonamide group, a disulfonimide group, an N-acylsulfonamide group, a carboxylic acid group, a sulfonic acid group, a hydroxyl group, an active methylene group, and an active methine group. Among these, more preferably, the anion includes an anionic group in which hydrogen is dissociated from at least one group selected from groups of a sulfonic acid group, a disulfonimide group, and an N-acylsulfonamide group.

pka of a conjugated acid of the anion is preferably equal to or less than 11, and more preferably equal to or less than 7.

Preferably, a cation and/or anion for constituting a salt which is contained in the electrolyte composition of the present invention includes an ethyleneoxy group represented by the following formula (3) in the structure thereof:

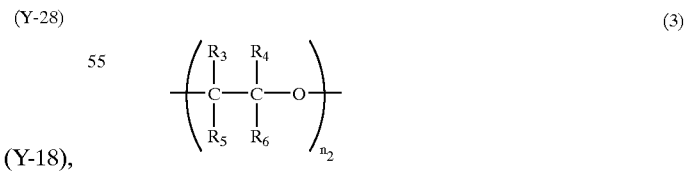

(3)

In formula (3), $R_3$ to $R_6$ independently represent a hydrogen atom or an alkyl group which may have a substituent group. Preferably, all of $R_3$ to $R_6$ are hydrogen atoms or any one of them is a methyl group.

In formula (3), $n_2$ represents any of integers from 1 to 20. Preferably, the integers are from 2 to 15, and more preferably 2 from to 10.

Further, in the aforementioned salt structure (including both anion and cation), when there is provided a plurality of groups represented by formula (3), these groups may be the same or different.

When the ethyleneoxy group is contained in an anion, the ethyleneoxy group can be included in the structure as a substituent group of the alkyl group or the alkenyl group or it can be contained in the structure by being bonded directly or via a linking group to the mesogen group. The ethyleneoxy group is preferably positioned near the mesogen group, and preferably bonded directly or via a linking group to the mesogen group.

A cation which is included in the salt which is contained in the electrolyte composition of the present invention may be organic or inorganic. Preferable examples of an organic cation are represented by the following formulae (4-a), (4-b), or (4-c).

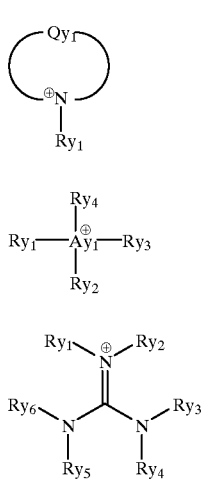

(4-a)

(4-b)

(4-c)

In formula (4-a), $Q_{y1}$ represents an atom which is able to form 5 or 6-membered aromatic cation, together with a nitrogen atom, and $R_{y1}$ represents a substituted or unsubstituted alkyl or alkenyl group.

In formula (4-b), $A_{y1}$ represents a nitrogen atom or a phosphorus atom, $R_{y1}$, $R_{y2}$, $R_{y3}$, and $R_{y4}$ independently represent a substituted or unsubstituted alkyl group or alkenyl group, and two or more of $R_{y1}$, $R_{y2}$, $R_{y3}$, and $R_{y4}$ may be bonded to one another to form a non-aromatic ring including $A_{y1}$.

In formula (4-c), $R_{y1}$, $R_{y2}$, $R_{y3}$, $R_{y4}$, $R_{y5}$, and $R_{y6}$ independently represent a substituted or unsubstituted alkyl group or alkenyl group, and two or more thereof may be bonded to one another to form a ring structure.

Cations represented by formulae (4-a) to (4-c) can independently form a polymer via $Q_{y1}$ or $R_{y1}$ to $R_{y6}$.

In formula (4-a), an atom included in the atomic group $Q_{y1}$ which, together with nitrogen, can form an aromatic 5 or 6-membered ring cation is preferably an atom selected from carbon, hydrogen, nitrogen, oxygen, and sulphur. A 6-membered ring which is made complete by $Q_{y1}$ and a nitrogen atom is preferably pyridine, pyrimidine, pyridazine, pyrazine, or triadine, more preferably pyridine. Further, an aromatic 5-membered ring which is finished by $Q_{y1}$ and a nitrogen atom is preferably oxazole, thiazole, imidazole, pyrazole, isoxazole, thiadiazole, oxadiazole, or troazole, more preferably, oxazole, thiazole, or imidazole, and particularly preferably oxazole and thiazole.

In formulae (4-a), (4-b), and (4-c), preferably, $R_{y1}$ to $R_{y6}$ independently represent a substituted or unsubstituted alkyl group whose number of carbon atoms (referred to as C number hereinafter) is preferably 1 to 24, which has a normal or branched chain, which may be cyclic, and examples of which include: methyl, ethyl, propyl, butyl, i-propyl, pentyl, hexyl, octyl, 2-ethylhexyl, t-octyl, decyl, dodecyl, tetradecyl, 2-hexyldecyl, hexadecyl, octadecyl, cyclohexyl, and cyclopentyl); a polymerizable group (preferable examples of which include: a vinyl group, an acryloyl group, a methacryloyl group, a styryl group, and a cinnamic acid residue); a substituted or unsubstituted alkenyl group (whose C number is preferably 2 to 24, which has a linear or branched chain, and which is, for example, vinyl or allyl). An alkyl group having C number of 3 to 18 and an alkenyl group having C number of 2 to 18 are preferable, and an alkyl group having C number of 4 to 6 is more preferable.

In formulae (4-a), (4-b), and (4-c), $Q_{y1}$ and $R_{y1}$ to $R_{y6}$ may have a substituent group. Preferable examples of the substituent group include: a halogen atom (F, Cl, Br, I), a cyano group, an alkoxy group (methoxy, ethoxy, methoxyethoxy or the like), an allyloxy group (phenoxy), an alkylthio group (methylthio, ethylthio or the like), an acyl group (acetyl, propionyl, benzoyl or the like), a sulfonyl group (methanesulfonyl, benzenesulfonyl or the like), an acyloxy group (acetoxy, benzoyloxy or the like), a sulfonyloxy group (methanesulfonyloxy, toluenesulfonyloxy or the like), a phosphonyl group (diethylphosphonyl group or the like), an amide group (acetylamide, benzoyl, or the like), a carbamoyl group (N,N-dimethylcarbamoyl, N-phenylcarbamoyl or the like), an alkyl group (methyl, ethyl, propyl, isopropyl, cyclopropyl, butyl, 2-carboxyethyl, benzil or the like), an allyl group (phenyl, toluyl or the like), a heterocyclic group (such as pyridyl, imidazolyl, furanyl or the like), an alkenyl group (vinyl, 1-propenyl or the like), and a polymerizable group (a vinyl group, an acryloyl group, a methacryloyl group, a styryl group, a cinnamic acid residue or the like).

Examples of the aforementioned inorganic cation include: an alkali metal ion (such as a lithium ion, a sodium ion or the like), an alkaline earth metal (such as a magnesium ion or the like), and an ammonium ion, and the like. In a case in which the electrolyte composition of the present invention is used for the application of an electrolyte for a lithium secondary battery, there can be used a salt containing therein a lithium ion as a cation.

A cation and/or an anion for constituting a salt which is contained in the electrolyte composition of the present invention may have at least one polymerizable group in the structure thereof. In a case in which the aforementioned salt contains a polymerizable group, when a battery is filled with this salt, the salt is in solution state, and after the filling, this solution can be solidified due to a polymerization. Therefore, it is possible to provide a battery which is easily handled during use and which is excellent in durability. Consequently, it is preferable that the aforementioned salt has the polymerizable group. Examples of the polymerizable group include: a vinyl group, an acryloyl group, a methacryloyl group, a styryl group, a cinnamic acidic group residue, and the like, and the acryloyl group and the methacryloyl group are particularly preferable.

A preferable example of a salt which is contained in the electrolyte composition of the present invention can be represented by the following formula (2):

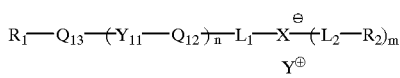

(2)

In formula (2), $Y_{11}$ represents a bivalent 4 to 7-membered ring group, or a condensed ring group which is formed thereof, $Q_{12}$ and $Q_{13}$ independently represent a bivalent linking group or a single bond, n represents 1, 2 or 3, and when n is 2 or 3, a plurality of $Y_{11}$ and $Q_{12}$ may be the same or different, respectively. $Y_{11}$ is defined in the same manner as that in formula (1), and the preferable range thereof is also the same as that in formula (1). $Q_{12}$ and $Q_{13}$ are defined in the same manner as those in formula (1), and the preferable range thereof is also the same as those in formula (1). $Q_{13}$ is particularly preferably —O—.

In formula (2), $R_1$ represents a substituted or unsubstituted alkyl group or alkenyl group having 6 carbons or more. $R_1$ is defined in the same manner as the above-described alkyl or alkenyl group having 6 carbons or more, and the preferable range of the number of carbon atoms thereof is also the same. Further, the substituted or unsubstituted alkyl group or alkenyl group having 6 carbons or more represented by $R_1$ may have a substituent group. The substituent group may be the same as that of the above-described alkyl or alkenyl group having 6 carbons or more, and the preferable range thereof is also the same. Preferably, $R_1$ is unsubstituted or, as a substituent group, has a polymerizable group (more preferably, an acryloyl group or a methacryloyl group) at the terminal of the alkyl or alkenyl group.

In formula (2), $L_1$ and $L_2$ independently represent a bivalent linking group or a direct bond. Preferable examples of the linking group such as the bivalent linking group include: —CH═CH—, —CH═N—, —N═N—, —N(O) ═N—, —COO—, —COS—, —CONH—, —COCH$_2$—, —CH$_2$CH$_2$—, —OCH$_2$—, —CH$_2$NH—, —CH$_2$—, —CO—, —O—, —S—, —NH—, —(CH$_2$)$_k$—, —CH═CH—COO—, —CH═CH—CO—, —(C≡C)$_k$—, a combination thereof (such as an ethyleneoxy group represented by formula (3)), and the like. —CH$_2$—, —CO—, —O—, —CH═CH—, —CH═N—, —N═N—, and a combination thereof (such as an ethyleneoxy group represented by formula (3)) are particularly preferable. Further, there can be used the linking groups whose hydrogen atom is substituted. Each of $L_1$ and $L_2$ is preferably a direct bond or an ethyleneoxy group represented by formula (3).

In formula (2), $R_2$ represents a substituent group. As an example of the substituent group, there can be used the same groups as those of the above-described alkyl or alkenyl group having 6 carbons or more. Preferably, $R_2$ is a substituted or unsubstituted alkyl group, an alkoxy group, or a polymerizable group (more preferably, an acryloyl group, a metacryloyl group or the like).

In formula (2), m represents 0 or 1.

In formula (2), $X^-$ represents an anionic group. The aforementioned anionic group is preferably an anionic group in which hydrogen is dissociated from at least one group selected from groups of a sulfonamide group, a disulfonimide group, an N-acylsulfonamide group, a carboxylic acid group, a sulfonic acid group, a hydroxyl group, an active methylene group, and an active methine group.

In formula (2), $Y^+$ represents an organic or inorganic cation. In a case in which $Y^+$ is an organic cation, the organic cation may contain a polymerizable group. The organic cation is preferably a cation represented by any one of the formulae (4-a) to (4-c). When the organic cation is represented by any one of the formulae (4-a) to (4-c), the polymerizable group is contained in the structure as a substituent group of $Q_{y1}$ and $R_{y1}$ to $R_{y6}$ in formula. When $Y^+$ is an inorganic cation, the inorganic cation is preferably a lithium ion.

In formula (2), an anion may form a polymer mainly at $R_1$, $R_2$, $X^-$ and $L_2$ [for example, (A-7), (A-8), (A-12), and (A-28) in the following specific examples].

Specific examples of a cation (C-1 to 20) and specific examples of an anion (A-1 to 35) capable of forming a salt which is contained in the electrolyte composition of the present invention will be described hereinafter. Further, preferable combinations of these specific examples (F-1 to 43) are shown in table 1. However, the electrolyte composition of the present invention is not limited to the following specific examples. Specific examples of cation (C-1 to 20)

(C-1)

Li$^{\oplus}$

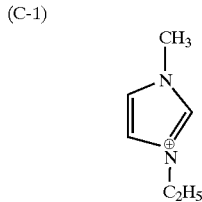

(C-2)

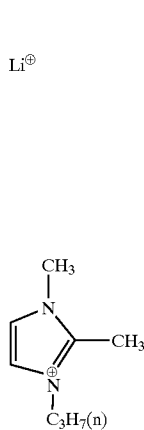

(C-3)

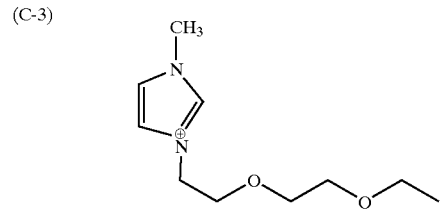

(C-4)

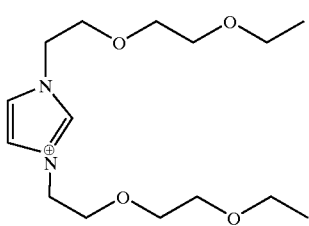
(C-5)
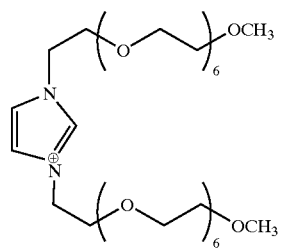
(C-6)
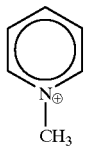
(C-7)
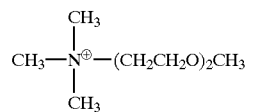
(C-8)
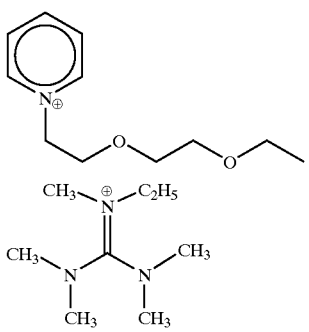
(C-9)
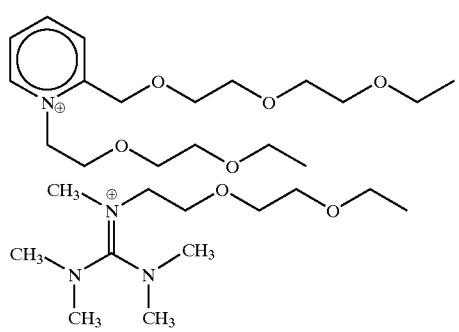
(C-10)
[0060]
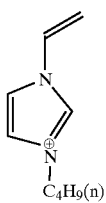
(C-13)
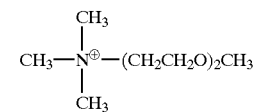
(C-14)
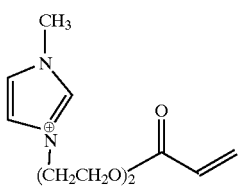
(C-15)
(C-16)
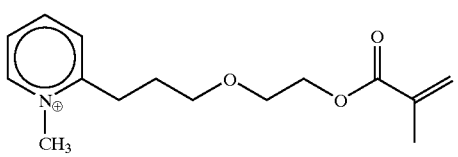
(C-17)
(C-18)
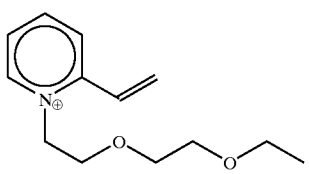
(C-19)

(C-20)
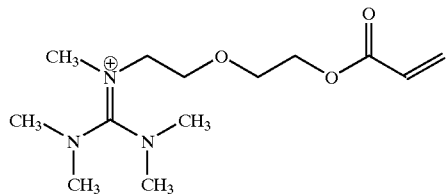
Specific examples of anion (A-1 to 35)
(A-1)
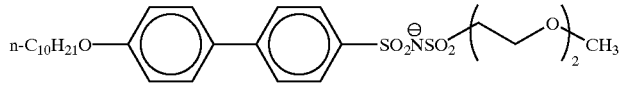
(A-2)
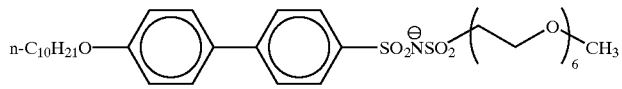
(A-3)
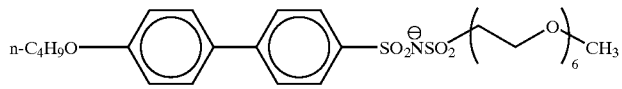
(A-4)
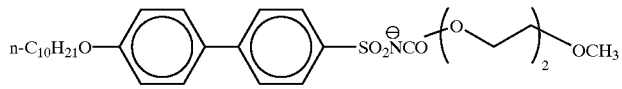
(A-5)
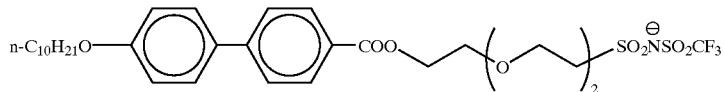
(A-6)
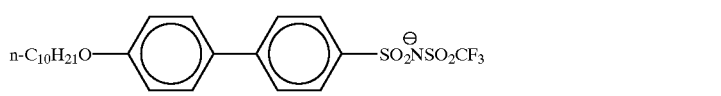
(A-7)
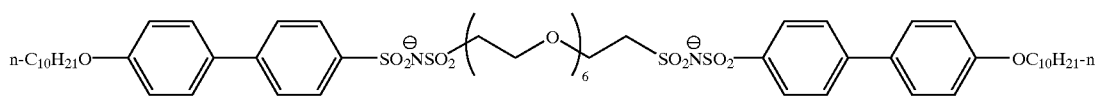
(A-8)
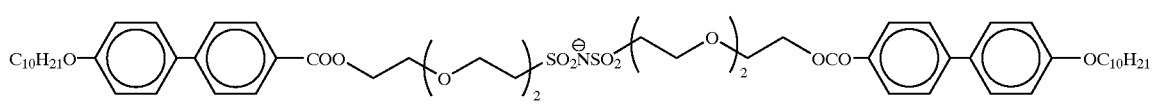
(A-9)
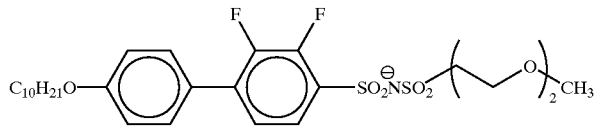
(A-10)
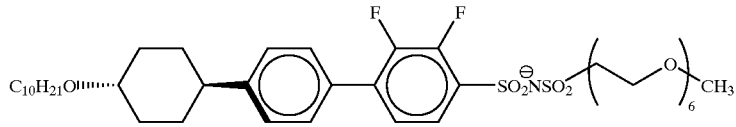
(A-11)
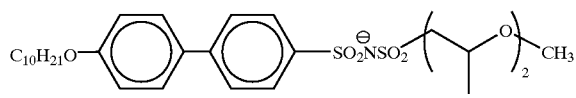

-continued
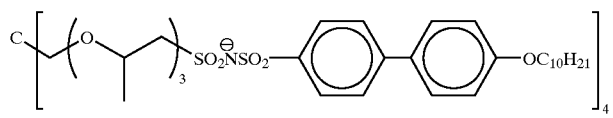
(A-12)
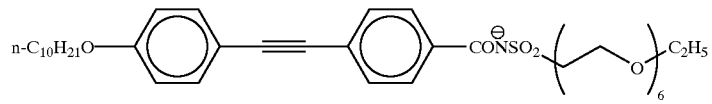
(A-13)
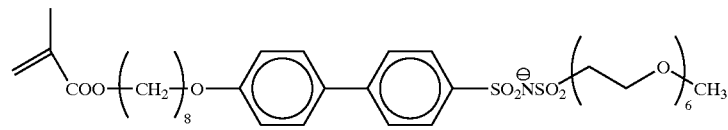
(A-14)
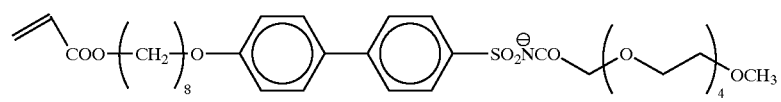
(A-15)
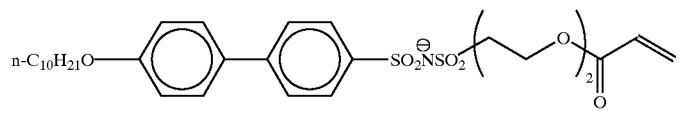
(A-16)
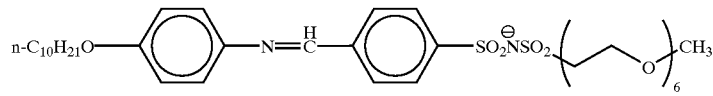
(A-17)
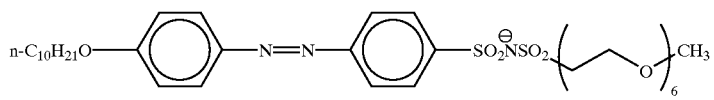
(A-18)
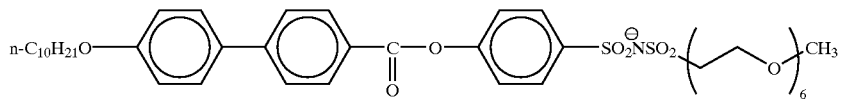
(A-19)
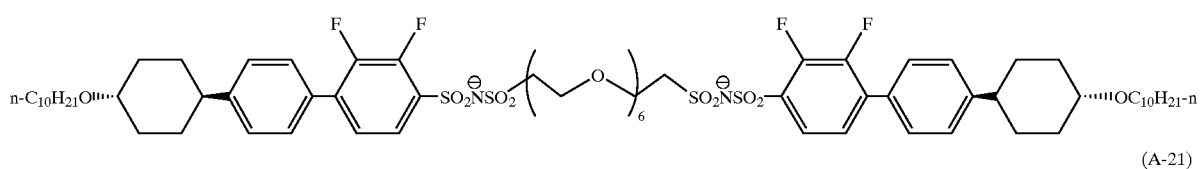
(A-20)
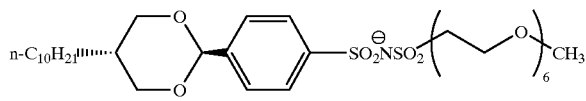
(A-21)
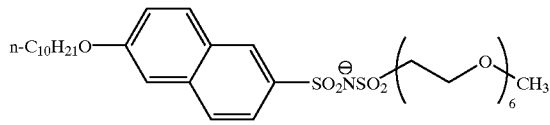
(A-22)
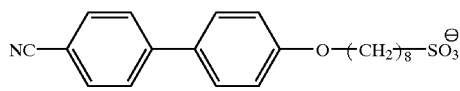
(A-23)

(A-24)
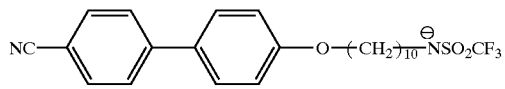
(A-25)
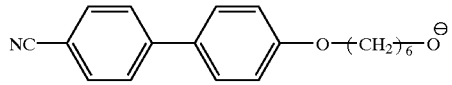
(A-26)
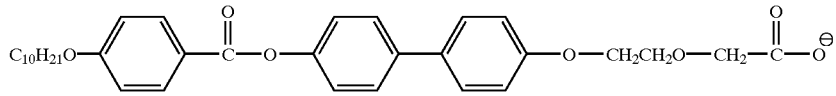
(A-27)
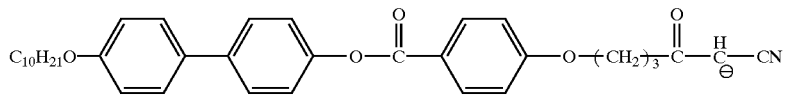
(A-28)
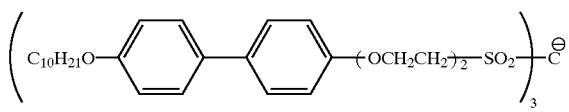
(A-29)
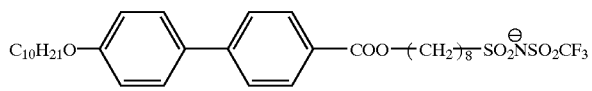
(A-30)
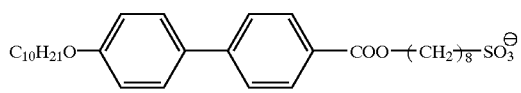
(A-31)
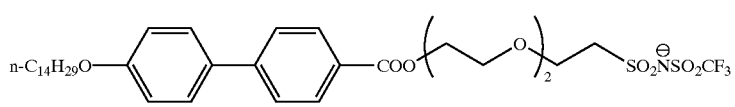
(A-32)
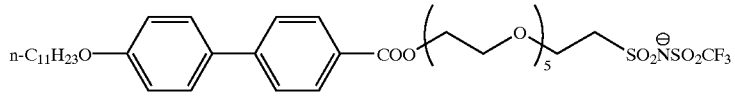
(A-33)
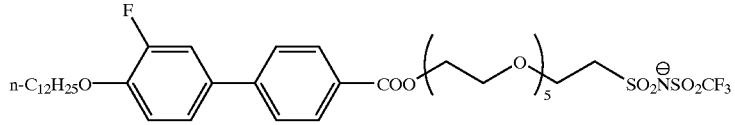
(A-34)
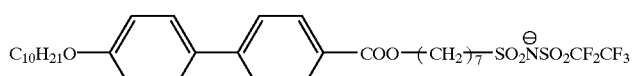
(A-35)
(A-36)
(A-37)
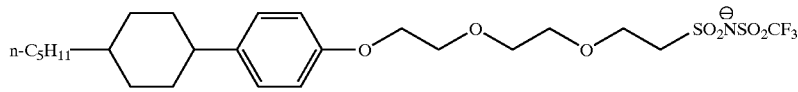

-continued

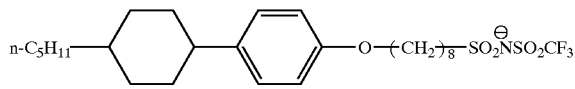
(A-38)

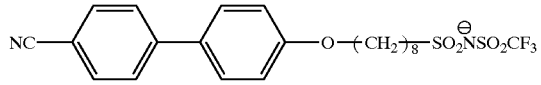
(A-39)

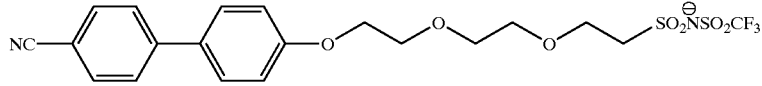
(A-40)

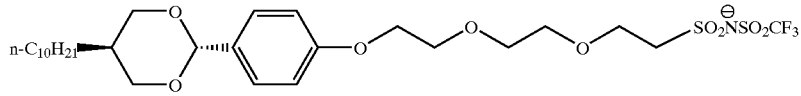
(A-41)

(A-42)

TABLE 1

Examples of combination of anion and cation

| compound number | anion | cation | compound number | anion | cation |
|---|---|---|---|---|---|
| F-1 | A-1 | C-1 | F-24 | A-11 | C-2 |
| F-2 | A-1 | C-2 | F-25 | A-12 | C-1 |
| F-3 | A-1 | C-5 | F-26 | A-13 | C-1 |
| F-4 | A-2 | C-1 | F-27 | A-14 | C-1 |
| F-5 | A-2 | C-2 | F-28 | A-15 | C-1 |
| F-6 | A-2 | C-8 | F-29 | A-15 | C-2 |
| F-7 | A-3 | C-1 | F-30 | A-15 | C-14 |
| F-8 | A-3 | C-2 | F-31 | A-16 | C-1 |
| F-9 | A-4 | C-1 | F-32 | A-16 | C-2 |
| F-10 | A-4 | C-2 | F-33 | A-16 | C-15 |
| F-11 | A-5 | C-1 | F-34 | A-17 | C-1 |
| F-12 | A-5 | C-5 | F-35 | A-17 | C-2 |
| F-13 | A-6 | C-1 | F-36 | A-18 | C-1 |
| F-14 | A-6 | C-6 | F-37 | A-18 | C-2 |
| F-15 | A-7 | C-1 | F-38 | A-31 | C-1 |
| F-16 | A-7 | C-2 | F-39 | A-31 | C-2 |
| F-17 | A-7 | C-8 | F-40 | A-31 | C-5 |
| F-18 | A-8 | C-1 | F-41 | A-33 | C-1 |
| F-19 | A-9 | C-6 | F-42 | A-33 | C-2 |
| F-20 | A-10 | C-1 | F-43 | A-33 | C-5 |
| F-21 | A-10 | C-2 | F-44 | A-38 | C-1 |
| F-22 | A-10 | C-11 | F-45 | A-38 | C-2 |
| F-23 | A-11 | C-1 | F-46 | A-38 | C-3 |

The salt which is contained in the electrolyte composition of the present invention (which, in some cases, is referred to as the "salt of the present invention" hereinafter) contains a cation and/or an anion which may be a high polymer. If the anion is a high polymer, a moiety which contains the mesogen group and the alkyl or alkenyl group having the C number of 6 or more can be included as a repetitive unit for constituting a main chain of the polymer. Or the moiety can also be included as a moiety of many side chains extending from the main chain of the polymer. A high polymer including the moiety can be obtained due to polymerization of the anion or the cation. In the anion or the cation, not only the mesogen group, and the alkyl or alkenyl group having the C number of 6 or more but also a polymerizable group can be contained solely or in combination with other monomers, in the structure thereof. For example, in the compounds represented by formula (2), $R_1$ and/or $R_2$ in the anion is obtained by polymerizing a compound which is a polymerizable group or which has a polymerizable group as a substituent group.

In the salt of the present invention, a melting point is preferably 100° C. or less, more preferably 80° C. or less, and most preferably 60° C. or less. The lower limit of the melting point is not particularly limited.

When the electrolyte composition of the present invention is incorporated in a battery, it is incorporated therein by using a method in which the electrolyte composition is melted by heat and coated onto the electrodes or the electrodes are soaked with the electrolyte composition by a low boiling point solvent (such as methanol, acetonitrile, methylene chloride, or the like), and the solvent is later removed by heating, or the like.

Further, when the salt of the present invention contains a polymerizable group, the salt is incorporated in the electrodes, together with a polymerization initiator, and thereafter, it becomes possible to polymerize the salt by heat or light.

The electrolyte composition of the present invention can be mixed with a solvent or the like in the amount of 50 mass % or less, and used. However, in order to realize excellent durability and photoelectric conversion efficiency, in the electrolyte composition, the salt of the present invention is preferably contained in the amount of 70 mass % or more, more preferably 80 mass % or more, and most preferably 90 mass % or more The electrolyte composition of the present invention may contain other components along with the aforementioned salt of the present invention as desired.

The electrolyte composition of the present invention may contain a solvent along with the aforementioned salt of the present invention as desired. The content of a solvent in the electrolyte composition is preferably less than the aforementioned content of the salt of the present invention. As a solvent, it is desired to use a compound which has a low viscosity and which is able to improve ion kinematicity or that which has a high dielectric constant and which is able to improve an effective carrier density thus exhibiting an excellent ion conductivity. Examples of such a solvent include: carbonate compounds such as ethylene carbonate, propylene carbonate, and the like; heterocyclic compounds such as 3-methyl-2-oxazolidinone, and the like; ether compounds such as dioxane, diethylether, and the like; chain ethers such as ethyleneglycol dialkylether, propyleneglycol dialkylether, polyethyleneglycol dialkylether, polypropyleneglycol dialkylether, and the like; alcohols such as methanol, ethanol, ethyleneglycol monoalkylether; propyleneglycol monoalkylether, polyethyleneglycol monoalkylether, polypropyleneglycol monoalkylether, and the like; polyvalent alcohols such as ethylene glycol, propylene glycol, polyethylene glycol, polypropyleneglycol, glycerine, and the like; nitril compounds such as acetonitrile, glutarodinitrile, methoxyacetonitrile, propionitrile, benzonitrile, and the like; esters such as carboxylic ester, phosphoric ester, phosphonate, and the like; aprotic polar substances such as dimethyl sulfoxyde, sulforane and the like; water; and the like. Carbonate compounds such as ethylene carbonate, propylene carbonate, and the like; heterocyclic compounds such as 3-methyl-2-oxazolidinone, and the like; and nitrile compounds such as acetonitrile, glutarodinitrile, methoxyacetonitrile, propionitrile, benzonitrile, and the like; and esters are particularly preferable. These compounds can be used singly or in combination of two or more.

In view of the improvement of durability due to antivolatilization, a boiling point of the solvent under a normal pressure (i.e., 1 atmosphere) is preferably 200° C. or more, more preferably, 250° C. or more, and most preferably 270° C. or more. However, the present invention is not limited to those having such characteristics.

In a case in which the salt has a polymerizable group and it is polymerized before or after a battery is filled therewith, the electrolyte composition of the present invention may contain, along with the salt of the present invention, a polymerization initiator which is able to initiate polymerization of the salt. Further, in the electrolyte composition of the present invention can be contained other monomers (including cross-linking agents) which can be polymerized, along with the salt of the present invention. Further, for polymerization, it is possible to use a method of a radical polymerization which is a typical method of synthesis of a high polymer which is described in both "Experimental method of a synthesis of a high polymer" (written by Takayuki Otsu and Masayoshi Kinoshita: Kagaku Doujin) and "Lecture or polymerization reaction theory 1-radical polymerization (I)" (written by Takayuki Otsu: Kagaku Doujin). Further, it is possible to use both a thermal polymerization method using a thermal polymerization initiator and a photopolymerization method using a photopolymerization initiator.

Preferable examples of a thermal polymerization initiator include: azoic initiators such as 2,2'-azobis (isobutylonitrile), 2,2'-azobis (2,4-dimethylvaleronitorile), dimethyl 2,2'-azobis (2-methylpropionate), and the like; and peroxidic initiators such as benzoylperoxide and the like. Preferable examples of a photopolymerization initiator include:a-carbonyl compounds (disclosed in U.S. Pat. Nos. 2,367,661 and 2,367,670, respectively), acyloin ethers (disclosed in U.S. Pat. No. 244,828), α-hydrocarbonic substituted aromatic acyloin compounds (disclosed in U.S. Pat. No. 2,722,512), polynucleoquinone compounds (disclosed in U.S. Pat. Nos. 3,046,127 and 2,951,758, respectively), the combination of triallylimidazole dimer and p-aminophenylketone (disclosed in U.S. Pat. No. 35,493, 676), acrydine and phenadine compounds (disclosed in Japanese Pat. Application No. 60-105667 and U.S. Pat. No. 4,239,850), and Oxadiazole compounds (disclosed in U.S. Pat. No. 4,212,970). The amount in which the polymerization initiator is added to the electrolyte composition is preferably 0.01 mass % or more and 20 mass % or less, and more preferably 0.01 mass % or more and 10 mass % or less. A preferable molecular weight (a number average molecular weight) of the polymer obtained due to polymerization, if the salt is a monofunctional monomer, is preferably 5,000 to 1,000,000, and more preferably 10,000 to 500,000. Further, if the salt is a polyfunctional monomer, or if a crosslinking agent is used for the polymerization, the polymer in the aforementioned molecular weight forms a three dimensional network structure.

If the electrolyte composition of the present invention is used for an electrolyte of a photoelectric chemical battery, preferably, as a charge carrier, electrolytes that contain $I^-$ and $I_3^-$ in the electrolyte composition are used therewith, and they can be added thereto in the form of a freely selected salt. Generally, an $I_3^-$ salt is produced in the electrolyte composition by adding an idione ($I_2$) thereto in the presence of an iodine salt ($I^-$ salt). The $I_3^-$ produced is in the same amount that of the $I_2$ thus added. Accordingly, in a case in which the electrolyte composition of the present invention is utilized for a photoelectric chemical battery, preferably, an iodine salt compound and an iodine are contained in the electrolyte composition. As a preferable counter cation of the iodine salt compound, there can be provided a compound represented by the aforementioned formulae (4-a), (4-b) or (4-c). In the electrolyte composition of the present invention, the concentration of $I^-$ is preferably 10 to 90 mass % and more preferably 30 to 70 mass %. At this point, all of the remaining electrolyte component is preferably the salt of the present invention. Further, in the electrolyte composition of the present invention, the molecular weight of $I_3^-$ with respect to $I^-$ is preferably 0.1 to 50 mol %, more preferably 0.1 to 20 mol %, much more preferably 0.5 to 10 mol %, and most preferably 0.5 to 5 mol %.

Besides the aforementioned salt, there may be contained another salt in the electrolyte composition of the present invention. A salt to be used in combination with the aforementioned salt is preferably a combination of an organic cation represented by one of formulae (4-a), (4-b) and (4-c), and a freely selected anion. Preferable examples of the freely selected anion include a halogen ion (such as $Cl^-$, $Br^-$, $I^-$ etc.), $SCN^-$, $BF_4^-$, $PF_6^-$, $ClO_4^-$, $(CF_3SO_2)_2N^-$, $(CF_2SO_2)_2N-$, $CH_3SO_3$, $CF_3SO_3^-$, $CF_3COO^-$, $Ph_4B^-$, $(CF_3SO_2)_3C^-$, and the like, and among them, $SCN^-$, $CF_3SO_3^-$, $CF_3COO^-$, $(CF_3SO_2)_2N^-$, or $BF_4^-$ is particularly preferable. An iodine salt such as LiI, or an alkali metallic salt can be added. The amount in which the alkali metallic salt is added is preferably about 0.02 to 2 mass %, and more preferably 0.1 to 1 mass %.

In the case in which a salt which is used in combination with the aforementioned salt comprises an organic cation and a freely-selected anion, the cation may include a mesogen group and an alkyl or alkenyl group having 6 carbons or more in the structure thereof. Preferable examples of such a cation include those in which $R_{y1}$, $R_{y2}$, $R_{y3}$, $R_{y4}$, $R_{y5}$ or/and $Q_{y1}$ in the aforementioned formulae (4-a), (4-b) and (4-c) include a mesogen group and an alkyl or alkenyl group having 6 carbons or more. More preferable examples of the cation can be represented by the following formula (5):

Formula (5)

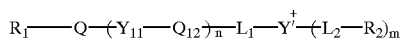

In formula (5), $R_1$, $R_2$, $L_1$, $L_2$, $Y_{11}$, $Q_{12}$, $Q_{13}$, and m and n are the same as those in formula (2). $Y_1^+$ represents organic cation portions represented by the formulae (4-a) to (4-c). $L_1$ and $L_2$ in formula (5) can be substituted by one of $Q_{y1}$, and $R_{y1}$ to $R_{y5}$, or can be substituted on an N atom or $A_{y1}$.

Specific examples of a salt which comprises a mesogen group and an alkyl or alkenyl group having 6 carbons or more in the structure thereof are shown below (D-1 to D-13).

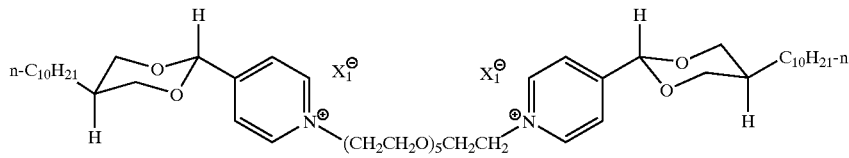

(D-1)

(D-1a) $X_1$ = I
(D-1b) $X_1$ = N(SO$_2$CF$_3$)$_2$
(D-1c) $X_1$ = BF$_4$

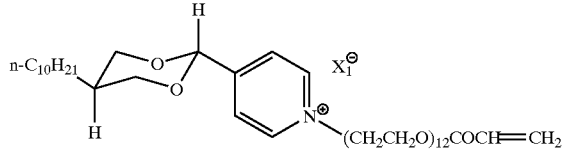

(D-2)

(D-2a) $X_1$ = I
(D-2b) $X_1$ = N(SO$_2$CF$_3$)$_2$
(D-2c) $X_1$ = BF$_4$

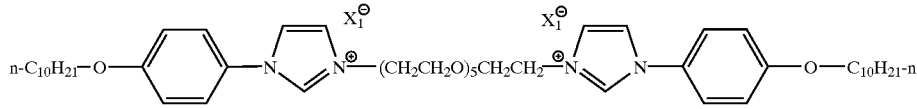

(D-3)

(D-3a) $X_1$ = I
(D-3b) $X_1$ = N(SO$_2$CF$_3$)$_2$
(D-3c) $X_1$ = PF$_6$

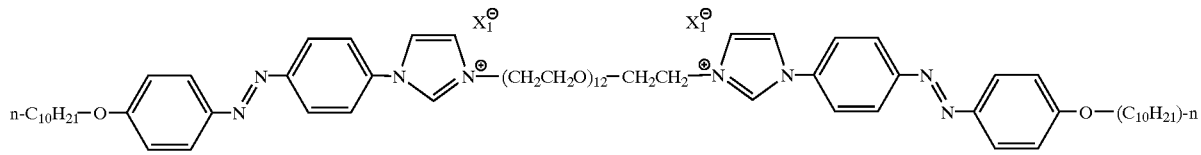

(D-4)

(D-4a) $X_1$ = I
(D-4b) $X_1$ = N(SO$_2$CF$_3$)$_2$
(D-4c) $X_1$ = PF$_6$

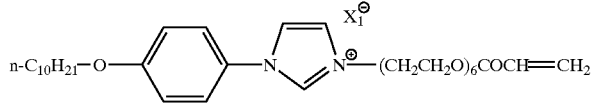

(D-5)

(D-5a) $X_1$ = I
(D-5b) $X_1$ = N(SO$_2$CF$_3$)$_2$
(D-5c) $X_1$ = BF$_4$

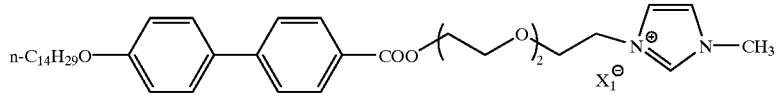
(D-6)
(D-6a) X1 = I
(D-6b) X1 = N(SO$_2$CF$_3$)$_2$
(D-6c) X1 = ClO$_4$
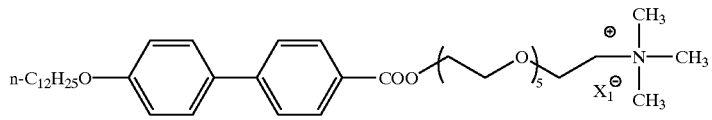
(D-7)
(D-7a) X$_1$ = I
(D-7b) X$_1$ = N(SO$_2$CF$_3$)$_2$
(D-7c) X$_1$ = CF$_3$COO
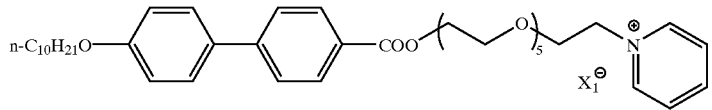
(D-8)
(D-8a) X$_1$ = Br
(D-8b) X$_1$ = N(SO$_2$CF$_3$)$_2$
(D-8c) X$_1$ = CF$_3$SO3
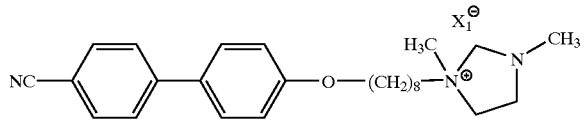
(D-9)
(D-9a) X$_1$ = Br
(D-9b) X$_1$ = N(SO$_2$CF$_3$)$_2$
(D-9c) X$_1$ = CF$_3$SO3
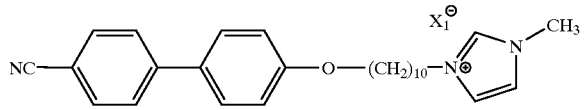
(D-10)
(D-10a) X$_1$ = I
(D-10b) X$_1$ = N(SO$_2$CF$_3$)$_2$
(D-10c) X$_1$ = SCN
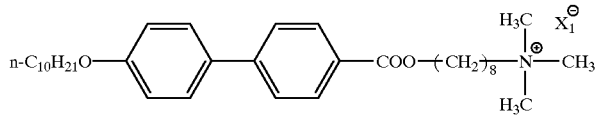
(D-11)
(D-11a) X$_1$ = I
(D-11b) X$_1$ = N(SO$_2$CF$_3$)$_2$
(D-11c) X$_1$ = BF$_4$

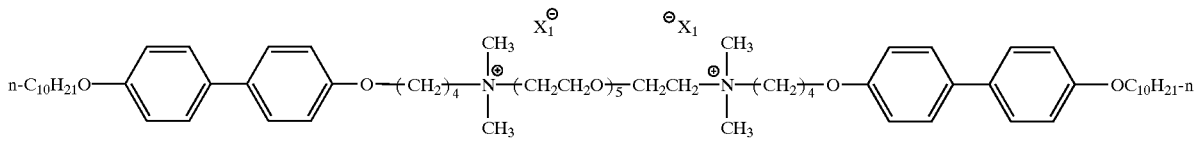

(D-12)

(D-12a) X₁ = I
(D-12b) X₁ = N(SO₂CF₃)₂
(D-12c) X₁ = BF₄

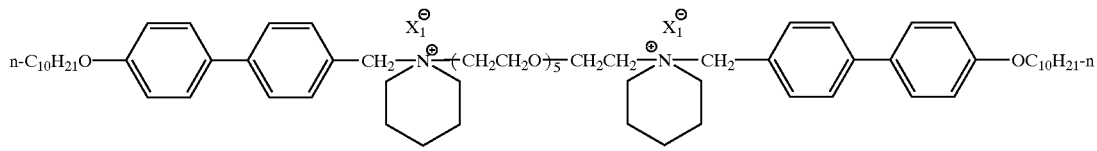

(D-13)

(D-13a) X₁ = I
(D-13b) X₁ = N(SO₂CF₃)₂
(D-13c) X₁ = BF₄

In the electrolyte composition of the present invention, there can be contained: a metallic iodide such as LiI, NaI, KI, CsI, CaI$_2$ or the like; an iodine salt of a quaternary imidazolium compound; an iodine salt such as a tetraalkylammonium compound; a metallic bromide such as Br$_2$ and LiBr, NaBr, KBr, CsBr, CaBr$_2$ or the like; a bromidic salt of a quaternary ammonium compound such as Br$_2$ and tetraalkylammoniumbromide, pyridiniumbromide or the like; a metallic complex such as ferrocyanic acidic salt-ferricyanic acidic salt, a ferrocene-ferricyanium ion or the like; an ionic compound such as sodium polysulfide, an alkylthiol-alkyldisulfide or the like; a viologen dye; and a hydroquinone-quinone, and the like. The amount in which these compounds are contained in the electrolyte composition is preferably 30 mass % or less in the whole mass of the electrolyte composition.

If the electrolyte composition of the present invention is used for a lithium ionic battery, at least one of the compounds which are to be contained in the electrolyte composition uses a salt whose cation is a lithium ion (the salt may be either the salt of the present invention or another salt which is used in combination with the electrolyte composition). The content of the salt which includes a lithium ion as a cation is preferably 5 to 100 mass %, and more preferably 20 to 60 mass %.

The electrolyte composition of the present invention can be used as a reactive solvent for a chemical reaction and a metal plating and the like, in a CCD (charge coupled device) camera, and various electrochemical batteries (so-called batteries). In the batteries, the electrolyte composition of the present invention is preferably used for an electrolyte of a non-aqueous secondary battery (especially, a lithium secondary battery) or that of a photoelectric chemical battery which uses semiconductors described below and more preferably, a photoelectric chemical battery.

[Photoelectric Chemical Battery]

A photoelectric chemical battery using the electrolyte composition of the present invention will be described hereinafter.

The photoelectric chemical battery of the present invention includes a charge transport layer containing the electrolyte composition, a photosensitive layer containing a semiconductor which was sensitized by a dye, and a counter electrode, and is structured such that a so-called photoelectric conversion element which will be described later is operated at an external circuit. The photoelectric chemical battery of the present invention, as it has the charge transport layer containing therein the electrolyte composition of the present invention, exhibits an excellent photoelectric conversion efficiency and an excellent durability in which deterioration of the battery performance with time is minimized.

[1] Photoelectric Conversion Element

In FIG. 1 is shown an example of a photoelectric conversion element which can be applied to the present invention.

A photoelectric conversion element 10 has a conductive layer 12, an undercoating layer 14, a photosensitive layer 16, a charge transport layer 18, and a counter electrode conductive layer 20 laminated on a support in this sequential order. The photosensitive layer 16 is formed by a semiconductor layer 24 which was sensitized by a dye d, and a charge transport material t. The semiconductor layer 24 is a porous layer which is formed by semiconductor particles s. Between the semiconductor particles are formed air gaps into which the charge transport material t is impregnated. The charge transport material t is formed by a component which is the same as a material used for the charge transport layer 18. A substrate 26 underlies the conductive layer 12, and a substrate 28 underlies the counter electrode conductive layer 20. The substrates 26 and 28 are merely provided for applying rigidity to the photoelectric conversion element, thus they need not be used. Further, at interfaces of respective layers such as an interface between the conductive layer 12 and the photosensitive layer 16, an interface between the photosensitive layer 16 and the charge transport layer 18, or an interface between the charge transport layer 18 and the counter conductive layer 20, structural components of each layer may be diffused and mixed. Moreover, light may be incident upon from one side or both sides of the photoelectric conversion element 10. Each of the conductive layer 12 and the substrate 26 and/or the counter electrode conductive layer 20 and the substrate 28 which are placed at a light incident side of the photoelectric conversion element 10 can be formed by a light transmissive material.

Next, an operation of the photoelectric conversion element 10 will be explained hereinafter. Further, a description of a case in which the semiconductor particle s is an n-type will be made hereinafter.

When light is incident on the photoelectric conversion element 10, the incident light is transmitted to the photosensitive layer 16, and then, is absorbed by a dye d or the like to thereby cause a dye d to be an excited state. The excited dye d or the like passes a high-energy electron to a conductive band of the semiconductor particle s, and the excited dye d itself becomes an oxidant. The electron which has shifted to the conductive band reaches the conductive layer 12 via a network of the semiconductor particle s. Therefore, the conductive layer 12 has a negative potential with respect to the counter electrode conductive layer 20. In an aspect in which the photoelectric conversion element 10 is utilized for a photocell, when the photocell is connected to an external circuit, the electron within the conductive layer 12 reaches the counter electrode conductive layer 20 while operating at the external circuit. In a case in which the charge transport material is an electrolyte, the electron reduces this electrolyte component (e.g., $I^-$), and the produced reductant (e.g., $I_3^-$) reduces the oxidant of a dye d to thereby return the dye d to its original state. Due to the continuous irradiation of light, a series of reactions follows to occur so that electricity can be taken out.

A description of materials which can be used for respective layers of the photoelectric conversion element and a method of forming the same will be made hereinafter. Further, in the following description, a "conductive support" may refer both to the conductive layer 12 only and to a conductive support which is formed by the conductive layer 12 and the substrate 26 which is provided arbitrarily. Further, a "counter electrode" may refer both to the counter electrode conductive layer 20 only and to the counter electrode which is formed by the counter electrode conductive layer 20 and the substrate 28 which is provided arbitrarily.

(A) Conductive Support

A conductive support is formed by (1) a single layer formed of a conductive layer or (2) two layers formed of a conductive layer and a substrate. In the case of (1), there can be used a metallic material (such as platinum, gold, silver, copper, zinc, titanium, aluminum, indium, alloys thereof or the like) in which, as a conductive layer, rigidity or sealability can be maintained sufficiently. In the case of (2), there can be used a substrate which has a conductive layer which contains a conductive agent at the side of a photosensitive layer. Preferable examples of the conductive agent include metals (such as platinum, gold, silver, copper, zinc, titanium, aluminum, indium, the alloy thereof or the like), carbon, conductive metallic oxide (such as indium-tin composite oxide or an oxide in which fluorine or antimony is doped in a tin oxide), and the like. Thickness of a conductive layer is preferably about 0.02 to 10 $\mu$m.

The lower the surface resistance of the conductive support the better. The preferable range of the surface electrical resistance is preferably 50$\Omega$/$\square$ or less and more preferably 20$\Omega$/$\square$ or less.

When light is irradiated from the side of the conductive support, it is preferable that the conductive support is substantially transparent. The above-described phrase, "substantially transparent" means that the transmittance in a part of the range or in the full range of light from a visible region to a near infrared region of light (400 to 1200 nm) is 10% or more, preferably 50% or more, and more preferably 80% or more. In particular, it is preferable that the transmittance of a wavelength region within which a photosensitive layer has a sensitivity is high.

Preferably, there is provided a transparent conductive support in which a transparent conductive layer made of a conductive metallic oxide is formed on the surface of a transparent substrate such as a glass or a plastic plate through application or deposition. Preferably, a transparent conductive layer is a tin oxide or an indium-tin oxide (ITO) in which fluorine or antimony was doped. As the transparent substrate, besides glass substrates such as a soda glass which is advantageous in view of a low manufacturing cost and rigidity and a non-alkaline glass which is not affected by an elution of alkali, there can be used a transparent polymer film. Examples of the transparent polymer film include: triacetyl cellulose (TAC), polyethylene terephthalate (PET), polyethylene naphthalate (PEN), syndiotactic polystyrene (SPS), polyphenylene sulfide (PPS), polycarbonate (PC), polyallylate (Par), polysulfone (PSF), polyestersulfone (PES), polyimide (PI), polyetherimide (PEI), a cyclic polyolefine, bromide phenoxy, and the like. In order to acquire a sufficient transparency, the amount in which the conductive metallic oxide is applied is preferably 0.01 to 100 g/1 $m^2$ of a glass or plastic plate.

In order to reduce the resistance of the transparent conductive support, it is preferable to use a metal lead. A material used for the metal lead is preferably platinum, gold, nickel, titanium, aluminum, copper, silver or the like. The metal lead is placed on a transparent substrate by a deposition method, a sputtering method or the like, and on this transparent conductive layer is preferably placed a transparent conductive layer formed of a conductive tin oxide or an ITO membrane. The amount in which an incident light is deteriorated by the placement of the metal lead is preferably 10% or less, and more preferably 1 to 5%.

(B) Photosensitive Layer

A photosensitive layer has a function to carry out a charge separation by absorbing light, and thereby generating electrons and positive holes. The photosensitive layer includes a semiconductor in which a dye was sensitized. In the semiconductor which was sensitized by the dye, the absorption of light and the generation of electrons and positive holes due to the light absorption occur mainly in the dye, and the semiconductor operates to receive this electron (or this positive hole) and then transmit the same. The semiconductor used in the present invention is preferably an n-type semiconductor in which a conductor electron becomes a carrier when under a light excitation and which imparts an anode current.

(1) Semiconductor

As a semiconductor, there can be used a simple semiconductor such as silicon, germanium, and the like, a III–V compound semiconductor, a metal chalcogenite (such as oxide, sulfide, selenide, a composite compound thereof, or the like), a compound having a perovskite structure (such as strontium titanate, calcium titanate, sodium titanate, barium titanate, lithium niobate or the like) or the like.

Preferable examples of a metal chalcogenite include: an oxide such as titanium, tin, zinc, iron, tungsten, zirconium, hafnium, strontium, indium, cerium, yttrium, lanthanum, vanadium, niobium or tantal; a sulfide such as cadmium, zinc, lead, silver, antimony or bismuth; a selenide such as cadmium or lead; a telluride such as cadmium, and the like. Examples of another compound semiconductor include: a phosphide such as zinc, gallium, indium, cadmium, or the like: a selenide such as gallium-arsenic or copper-indium, a sulfide such as copper-indium, and the like. Further, preferably, there can be used a composite compound represented by $M_xO_yS_z$ or $M^1{}_xM^2{}_yO_z$ ($M$, $M^1$, and $M^2$ are each a metal element, O is an oxygen atom, and x, y, and z are such numbers that the compound is neutral).

Preferably, specific examples of a semiconductor used for the present invention include: Si, $TiO_2$, $SnO_2$, $Fe_2O_3$, $WO_3$, ZnO, $Nb_2O_5$, CdS, $Fe_2O_3$, ZnS, PbS, $Bi_2S_3$, CdSe, CdTe, $SrTiO_3$, GaP, InP, GaAs, $CuInS_2$, $CuInSe_2$ or the like, more preferably $TiO_2$, ZnO, $SnO_2$, $Fe_2O_3$, $WO_3$, $Nb_2O_5$, CdS, PbS, CdSe, $SrTiO_3$, InP, GaAs, $CuInS_2$ or $CuInSe_2$, particularly preferably $TiO_2$ or $Nb_2O_5$, and most preferably $TiO_2$. $TiO_2$ that contains 70% or more of an anatase-type crystal is preferable and one that contains 100% of an anatase-type crystal is more preferable. Further, it is also effective to dope metals for increasing electron conductivity in these semiconductors. A bivalent or trivalent metal is preferably used as a metal to be doped. It is also effective to dope the semiconductor with a univalent metal for preventing an inverse current from flowing into the charge transport layer.

A semiconductor used for the present invention may be a single crystalline or a polycrystalline semiconductor. However, from viewpoints of a manufacturing cost, acquisition of a raw material, and an energy payback time, use of a polycrystalline is preferable, and use of a porous membrane formed of semiconductor particles is particularly preferable. Further, an amorphous portion can be contained in a portion of the semiconductor of the present invention.

The diameter of a semiconductor particle is generally in the order of from nm to μm. However, the mean particle diameter of primary particles, which is determined from a diameter is derived from forming a circle having the same area as the area of the semiconductor particle projected is preferably 5 to 200 nm, and more preferably 8 to 100 nm. The mean particle diameter of the semiconductor particles (secondary particles) in a dispersion solution is preferably 0.01 to 30 μm. Two or more of fine particles having different particle diameter distributions can be mixed. In this case, a mean size of smaller particles is preferably 25 nm or less, and more preferably 10 nm or less. In order to improve a light capturing rate when incident light is scattered, it is preferable to mix semiconductor particles having a large diameter, for example, 100 nm or more, that is about 300 nm.

Two or more different kinds of semiconductor particles can be mixed. When two or more kinds of semiconductor particles are used in combination, one of them is preferably $TiO_2$, ZnO, $Nb_2O_5$ or $SrTiO_3$. The other is preferably $SnO_2$, $Fe_2O_3$ or $WO_3$. Further, combinations of ZnO and $SnO_2$, ZnO and $WO_3$, or ZnO, $SnO_2$ and $WO_3$ are more preferable. When two or more kinds of semiconductor particles are mixed and used, respective particle diameters may be different. In particular, a combination in which one of the above-described two or more kinds of the semiconductor particles has a large particle diameter and the other(s) have a small particle diameter. Preferably, the large particle diameter is 100 nm or more, and the small particle diameter is 15 nm or less.

As a method of producing semiconductor particles, preferably, there can be used a gel-sol method as disclosed in "Sol-gel method science" edited by Sumio Sakuhana, published by Agne Shofusha (1998), "Thin film coating technique using a sol-gel method" published by Technical Information Associate (1995), and "Synthesis and size/shape control of monodispersed particle using a new synthetic method: A gel-sol method" edited by Tadao Sugimoto, published by Materia (volume No. 35, No. 9, pages 1012–1018 (1996)). Further, preferably, there can be used a method developed by Degussa Inc. in which an oxide is produced by hydrolyzing a chloride in an oxyhydrogen salt at a high temperature.

When a semiconductor particle is a titanium oxide, all of the above-described sol-gel method, gel-sol method, and high temperature hydrolyzing method of a chloride in oxyhydrogen salt are all favorable. However, further, there can also be used a sulfuric acid treatment method and a chlorine treatment method which are disclosed in "Physical properties and application technology of titanium oxide", edited by Manabu Seino, published by Gihodo Publication (1997). Moreover, as a sol-gel method, a method which is disclosed in "Journal of American ceramic society", edited by Barbe., et al (volume No. 80, No. 12, pages 3,157 to 3,171(1997) and a method disclosed in "Chemistry of materials", edited by Burnside., et al (volume No. 10, No. 9, pages 2,419 to 2,425).

(2) Semiconductor Particle Layer

The semiconductor is used, for example, in the form of a semiconductor particle layer which is formed on the conductive support. In order to apply semiconductor particles onto the conductive support, besides the above-described sol-gel method, there can be used a method of applying a dispersion solution or a colloidal solution of semiconductor particles onto the conductive support. When the mass-productivity of the photoelectric conversion element, the physical properties of the solution of semiconductor particles, the flexibility of the conductive support, and the like are taken into consideration, a wet film producing method is comparatively useful. Typical examples of the wet film producing method include a coating method, a printing method, an electrolyte precipitation method, and an electrodeposition method. Further, there can be used a method in which a metal is oxidized; a method in which a film is precipitated through a liquid phase from a metal solution by exchanging a ligand (LPD method); a method in which a film is deposited by a sputtering or the like; a CVD method; or an SPD method in which a metallic oxide precursor which thermally decomposes is sprayed onto a warmed-up substrate to thereby form a metallic oxide.

As a method in which a dispersion solution of semiconductor particles is produced, besides the above-described sol-gel method, there can be used a method in which semiconductor particles are triturated in a mortar, a method in which semiconductor particles are dispersed while being ground by using a mill, or a method in which, when a semiconductor is synthesized, the semiconductor is precipitated as particles into a solvent and used as it is.

As a dispersion medium, there can be used water or various organic solvents (such as methanol, ethanol, isopropyl alcohol, citronellol, tapineole, dichloromethane, acetone, acetonitrile, ethyl acetate, and the like). During the dispersion, as a dispersion assistant, there can be used as needed: polymers such as polyethylene glycol, hydroxyethyl cellulose, and carboxymethyl cellulose; surfactants; acids; or chelating agents. By altering the molecular amount of polyethyleneglycol, it becomes possible to adjust the viscosity of a dispersion solution, form an unpeelable semiconductor layer, and control the porosity of a semiconductor layer. Accordingly, it is preferable to add polyethyleneglycol to the dispersion medium.

Preferable examples of an application method include: an application system method such as a roller method, a dip method or the like; a metering system method such as an air knife method, a blade method or the like; a wire bar method disclosed in Japanese Pat. Publication (JP-B) No. 58-4589 in which the application system method and the metering system method can be applied at the same portion of a semiconductor layer; a slide hopper method; an extrusion method; and a curtain method which are disclosed respectively in U.S. Pat. Nos. 2,681,294, 2,761,419, and 2,761,791. Further, as an application machine for a general use, a spin method or a spray method is also preferable. As a wet printing method, in addition to three main printing methods such as a relief printing method, an off-set printing method, and a photogravure printing method, preferably, there can be used an intaglio printing method, a rubber plate printing method, and a screen printing method. From these printing method, there can be selected a preferable film producing method in accordance with liquid viscosity and wet thickness.

The layer of semiconductor particles is not limited to a single layer, whereby a dispersion solution of semiconductor particles having different diameters can be applied in a multi-layer or a coating layer having various semiconductor particles (or different binders or different additives) contained therein can be applied in a multi-layer. If a film thickness is not large enough with one time coating of the semiconductor particle layer, a multi-layer application may be employed.

As the thickness of the semiconductor particle layer (which is the same as that of the photosensitive layer) becomes large, the amount in which a dye is carried by the semiconductor particle layer per unit projection area increases, and a light capture rate thereby improves. However, the diffusion distance of an electron generated becomes large, and the loss of electrons due to a charge recoupling thereby increases. Therefore, the thickness of the semiconductor particle layer is preferably 0.1 to 100 $\mu$m. When the semiconductor particle layer is used for a photocell, the thickness of the layer is preferably 1 to 30 $\mu$m, and more preferably 2 to 25 $\mu$m. The amount in which semiconductor particles are applied onto a support per 1 m$^2$ is preferably 0.5 to 100 g, and more preferably 3 to 50 g.

After semiconductor particles have been applied onto the conductive support, a heat treatment of the support is preferably carried out in order to allow the semiconductor particles to be electronically connected to each other, and enhance the film application strength and the adhesiveness of the semiconductor particles with respect to the support. The range of the temperature at which the support is heated (which is referred to as "heat temperature" hereinafter) is preferably from 40° C. to 700° C., and more preferably from 100° C. to 600° C. Further, the time during which the support is heated is approximately from 10 minutes to 10 hours. When a support such as a polymer film whose melting point or softening point is low is used, if the support was treated at high temperature, the support is caused to deteriorate, whereby the treatment of the Ad support at high temperature is not preferable. In view of a manufacturing cost, the heat temperature of the support is preferably as low as possible (for example, 50° C. to 350° C.). The heat temperature can be lowered by performing a heat treatment of the support in the presence of small semiconductor particles whose particle diameter is 5 nm or less, mineral acids, or metallic oxide precursors. The heat temperature can also be lowered due to irradiation of ultraviolet radiation, infrared radiation, microwave or the like or due to application of an electric field or an ultrasonic wave. At the same time, in order to remove unnecessary organic substances, besides the above-described irradiation or application, there can be used an appropriate combination of heating, reduced pressure, oxygen plasma treatment, pure water washing, solvent washing, gas washing, and the like.

After the heat treatment, in order to enlarge the surface area of semiconductor particles, improve purity in vicinities of semiconductor particles, and increase an electron injection ratio from a dye to semiconductor particles, for example, there can be carried out a chemical plating treatment using a titanium tetrachloride solution or an electrochemical plating treatment using a titanium trichloride solution. Further, in order to prevent an inverse current from semiconductor particles from flowing into the charge transport layer, it is also effective to make particle surfaces adsorb organic substances which do not contain dyes and which have low electronic conductivity. As organic substances to be adsorbed, those having hydrophobic radicals are preferable.

The surface area of the semiconductor particle layer is preferably made large so as to adsorb as many dyes as possible. The surface area of the layer of semiconductor particles in a state in which the semiconductor particles are applied onto the support is preferably over 10 times as large as the projected area, more preferably over 100 times. This upper limit is not particularly limited, but ordinarily about 1,000 times.

(3) Dye

As a sensitizing dye which is used for the photosensitive layer, there can be used any compound which has a dye absorption in a visible range or a near infrared region, and which can sensitize the semiconductor. Preferable examples of the dye include an organic metallic complex dye, a methine dye, a porphyrin dye, a phthalocyanin dye, and the like. Further, in order to make a photoelectric conversion wavelength region as large as possible and improve a photoelectric conversion efficiency, two dyes or more can be used or mixed. In this case, it is possible to select a dye to be used or mixed and a ratio in which the dye is used or mixed such that the dye and the ratio correspond to the wavelength region and the intensity distribution of a target light source.

Preferably, such a dye includes an appropriate interlocking group which has adsorbability with respect to the semiconductor particle surfaces. Preferable examples of the interlocking group include: an acidic group such as a COOH group, an OH group, an SO$_3$H group, a —P(O)(OH)$_2$ group, or a —OP(O)(OH)$_2$ group; and a chelated group having a π conductivity such as oxime, dioxime, hydroxyquinoline, salicylate or α-ketoenolate. Among these, a COOH group, a —P(O)(OH)$_2$ group, or a —OP(O)(OH)$_2$ group is particularly preferable. These groups may form an alkaline metal or the like, and a salt, and may also form an intramolecular salt. Further, in the case of the polymethine dye, if a methine chain contains an acidic group like in the case in which the methine chain forms a squalirium ring or a chroconium ring, the polymethine dye has this part as an interlocking group.

A detailed description of a preferable sensitizing dye for the photosensitive layer will be made hereinafter.

(a) Organic Metallic Complex Dye

When a dye is a metallic complex dye, a metallic phthalocyanine dye, a metallic porphyrin dye or a ruthenium complex dye is preferable, and the ruthenium complex dye is particularly preferable. Examples of the ruthenium complex dye include those disclosed in U.S. Pat. Nos. 4,927,721, 4,684,537, 5,084,365, 5,350,644, 5,463,057, and 5,525,440 and those disclosed in Japanese Pat. Application Laid-Open (JP-A) No. 7-249790, Japanese National Publication No. 10-504512, World Patent No. 98/50393, JP-A No. 2000-26487, and the like.

Further, if the aforementioned dye is a ruthenium complex dye, one represented by the following formula (5) is preferable:

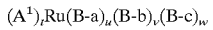

In formula (5), A$^1$ represents an unidentate or bidentate ligand. Al is preferably a ligand selected from a group of dielectrics such as Cl, SCN, H₂O, Br, I, CN, NCO, SeCN, β-diketone, an oxalic acid, and a dithiocarboxylic acid. When t is 2 or more, A¹ which is 2 or more may be the same or different. In formula (5), B-a, B-b, and B-c independently represent a ligand represented by the following formulae (B-1) to (B-10). t represents any integers from 0 to 3, and u, v, and w respectively represent 0 or 1 and are appropriately combined in accordance with the kind of the ligand so that the ruthenium complex represented by formula (5) forms a six-coordinate complex.

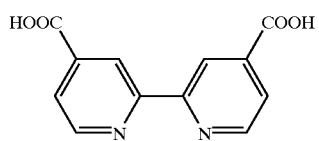
(B-1)

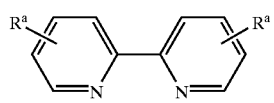
(B-2)

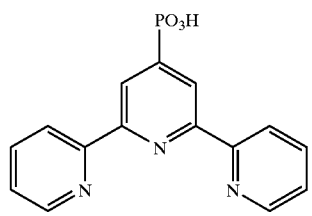
(B-3)

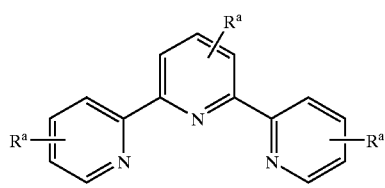
(B-4)

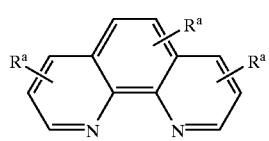
(B-5)

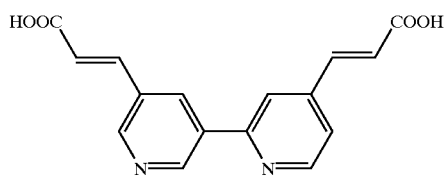
(B-6)

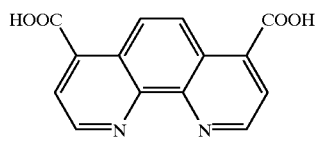
(B-7)

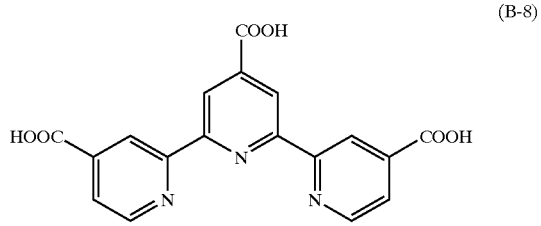
(B-8)

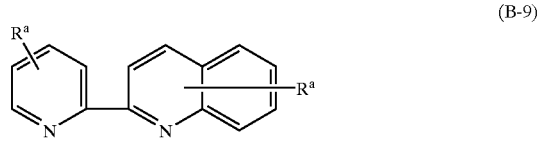
(B-9)

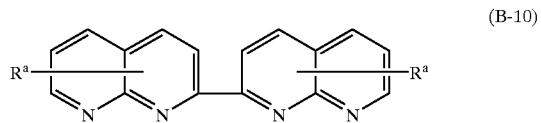
(B-10)

In the aforementioned formulae (B-1) to (B-10), $R^a$ represents a hydrogen atom or a substituent group, and examples of the substituent group include: a halogen atom; a substituted or unsubstituted alkyl groups having 1 to 12 carbon atoms; a substituted or unsubstituted allyl group having 6 to 12 carbon atoms; an acidic group (which may constitute a salt) or a chelate group. An alkyl part of the alkyl group or the aralkyl group may have a linear or branched chain. Further, an allyl part of the alkyl group or the aralkyl group can be either single cyclic or polycyclic (condensed ring or aggregated ring). In formula (5), B-a, B-b, and B-c may be the same or different.

Preferable examples of the organic metallic complex dye (Exemplary compounds: R-1 to 17) are shown below. However, a dye used for the present invention is not limited to these examples.

| | $(A^1)_p Ru(B-a)(B-b)(B-c)$ | | | | | |
|---|---|---|---|---|---|---|
| | A¹ | p | B-a | B-b | B-c | $R^u$ |
| R-1 | SCN | 2 | B-1 | B-1 | — | — |
| R-2 | CN | 2 | B-1 | B-1 | — | — |
| R-3 | Cl | 2 | B-1 | B-1 | — | — |
| R-4 | CN | 2 | B-7 | B-7 | — | — |
| R-5 | SCN | 2 | B-7 | B-7 | — | — |
| R-6 | SCN | 2 | B-1 | B-2 | — | H |
| R-7 | SCN | 1 | B-1 | B-3 | — | — |
| R-8 | Cl | 1 | B-1 | B-4 | — | H |
| R-9 | I | 2 | B-1 | B-5 | — | H |
| R-10 | SCN | 3 | B-8 | — | — | — |
| R-11 | CN | 3 | B-8 | — | — | — |
| R-12 | SCN | 1 | B-2 | B-8 | — | H |
| R-13 | — | 0 | B-1 | B-1 | B-1 | — |

R-14
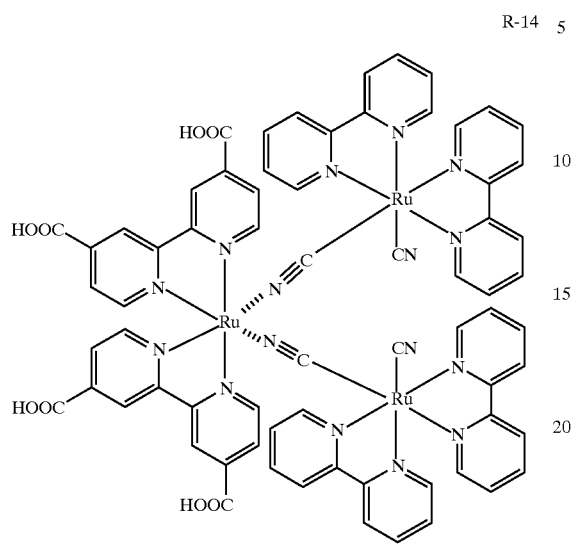
R-15
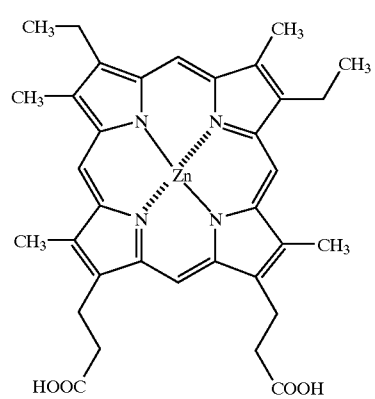
R-16
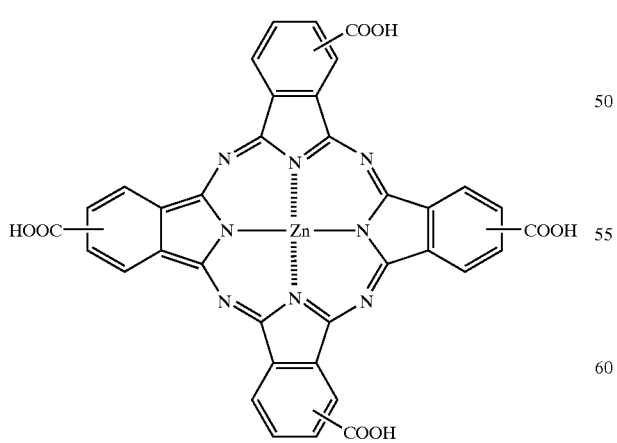
R-17
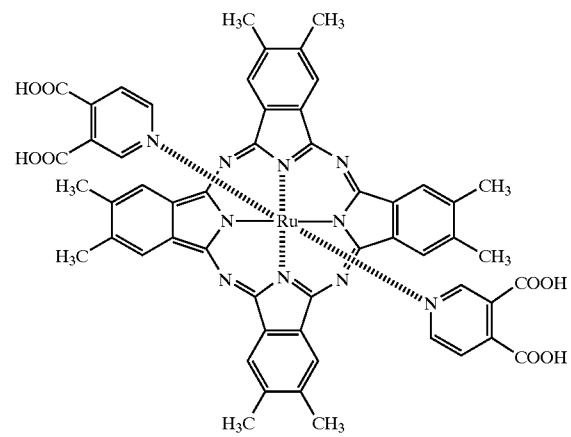
(b) Methine Dye
A preferable methine dye use for the present invention is a polymethine dye such as a cyanine dye, a merocyanine dye, or a squalirium dye. Preferable examples of the polymethine dye used for the present invention are those disclosed in JP-A Nos. 11-35836, 11-67285, 11-86916, 11-97725, 11-158395, 11-163378, 11-214730, 11-214731, 11-238905, and 2000-26487; and European Patent Nos. 892411, 911841, and 991092. Examples of preferable methine dyes are shown below:
M-1
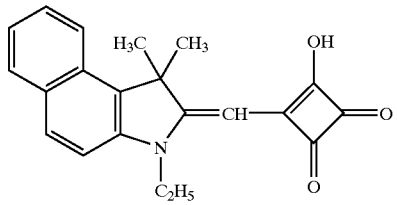
M-2
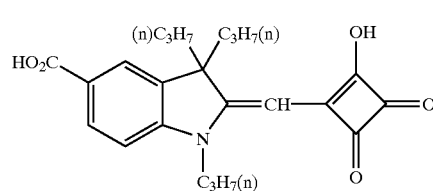
M-3
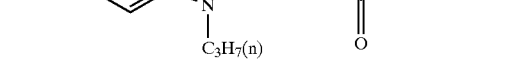
M-4
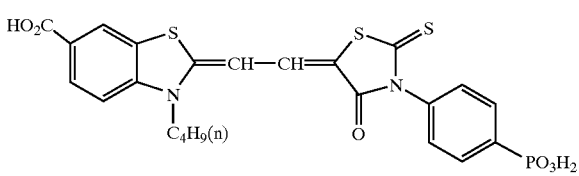

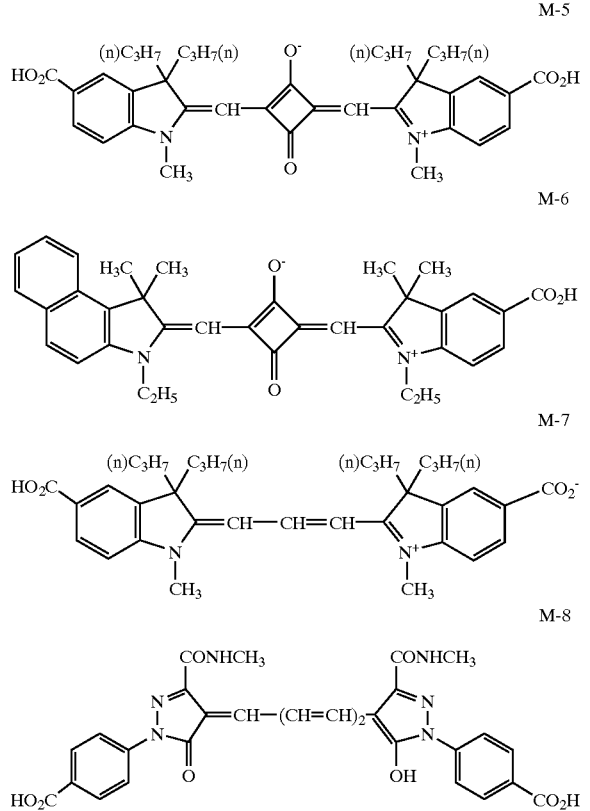

(4) Adsorption of a Dye to Semiconductor Particles

In order to adsorb a dye to semiconductor particles, there can be used a method in which a conductive support having a well dried semiconductor particle layer is immersed into a dye solution or a method in which the dye solution is applied onto the semiconductor particle layer. In a case of the former method, there can be used an immersion method, a dip method, a roller method, an air knife method, and the like. In a case of the immersion method, dye adsorption can be carried out at room temperature or it can be done due to heating and reflux as disclosed in JP-A No. 7-249790. As the latter application method, there can be used a wire bar method, a slide hopper method, an extrusion method, a curtain method, a spin method, a spray method, and the like. Preferable examples of solvents for dissolving a dye include: alcohols (such as methanol, ethanol, t-butanol, benzyl alcohol, and the like); nitriles (such as acetonitrile, propionitrile, 3-methoxypropionitrile, and the like); nitromethane; halogenated hydrocarbons (such as dichloromethane, dichloroethane, chloroform, chlorobenzene, and the like), ethers (such as diethyl ether, tetrahydrofuran, and the like), dimethyl sulfoxide, amides (such as N,N-dimethylformamide, N,N-dimethylacetamide, and the like), N-methylpyrolidone, 1,3-dimethylimidazolidinone, 3-methyloxazolidinone, esters (such as ethyl acetate, butyl acetate, and the like), carbonic esters (such as diethyl carbonate, ethylene carbonate, propylene carbonate, and the like), ketones (such as acetone, 2-butanone, cyclohexanone, and the like), hydrocarbons (hexane, petroleum ether, benzene, toluene, and the like) or mixed solvents thereof.

The total amount of a dye adsorbed to semiconductor particles is preferably 0.01 to 100 mmol per unit surface area (1 $m^2$) of a porous semiconductor electrode substrate.

Further, the amount in which a dye is adsorbed to semiconductor particles is preferably within a range from 0.01 to 1 mmol per 1 g of the semiconductor particles. This range of the dye adsorption amount allows the semiconductor to sufficiently obtain a sensitizing effect. When the dye adsorption amount is too small, the sensitizing effect deteriorates. Conversely, when the dye adsorption amount is too large, a dye since it is not adhered to the semiconductor particles begins to float away, thereby causing the sensitizing effect to deteriorate. In order to increase the dye adsorption amount, it is preferable to carry out a heat treatment prior to a dye absorption. After the completion of the heat treatment, in order to prevent water from being adsorbed to semiconductor particle surfaces, the temperature of the semiconductor electrode substrate is not cooled to an ordinary temperature but is kept between 60° C. and 150° C. so that a prompt dye adsorption operation is carried out. Moreover, in order to prevent the occurrence of interactions such as aggregation between dyes or the like, a colorless compound may be added to a dye, and both the compound and the dye can be adsorbed to the semiconductor particle surfaces. An effective compound which suffices this purpose is one which has a surface active characteristic or structure, such as steroid compounds having a carboxyl group (e.g., a chenode oxycholic acid) or sulfonates such examples as described below.

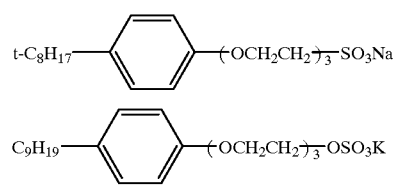

Preferably, dyes which are not adsorbed to semiconductor particles are removed by washing immediately after the adsorption. Preferably, the washing is carried out in a wet washing reservoir by means of a polar solvent such as acetonitrile or an organic solvent such as an alcoholic solvent. After dyes have been adsorbed, the semiconductor particle surfaces can be treated by using amines or quaternary salts. Preferable examples of amines include: pyridine, 4-t-butylpyridine, polyvinylpyridine, and the like. Preferable examples of quaternary salts include tetrobutyl ammonium iodide, tetrahexyl ammonium iodide, and the like. If they are in a liquid state, they can be used as they are or by being dissolving in the organic solvent.

(C) Charge Transport Layer

A charge transport layer is one that includes a charge transport material having a function which replenishes a dye oxidant with electrons. Examples of a typical charge transport material which may be used for this charge transport layer include: (i) as ion transport materials, a solution (electrolyte solution) in which an oxidant-reductant pair ion is dissolved; a so-called gel electrolyte in which an oxidation-reduction pair solution is impregnated into the gel of a polymer matrix; a molten salt electrolyte which contains the oxidation-reduction pair ion; and a solid electrolyte. Further, besides the charge transport material involving ions, (ii) as a charge transport material involving a carrier movement in a solid matter, there can be used a charge transport material or a positive hole transport material. In the present invention, the electrolyte composition of the present invention is used for this charge transport layer. However, it is possible to use the above-described charge transport materials except the electrolyte composition of the present invention.

(1) Formation of a Charge Transport Layer

There are two methods of forming a charge transport layer. One of them is to laminate a counter electrode and a photosensitive layer to each other beforehand and insert a liquid charge transport layer into the gap therebetween. The other is to provide the charge transport layer directly on the photosensitive layer and thereafter provide the counter electrode thereon.

In the former method, as a method of inserting the charge transport layer into the gap, there can be used a normal pressure process in which a capillary phenomenon due to immersion or the like is utilized, or a vacuum process in which a vapor phase is converted to a liquid phase at a pressure which is made to be lower than the normal pressure.

In the latter method, in a wet charge transport layer, a counter electrode is provided on the wet charge transport layer while it is still wet to thereby prevent leakage of liquid at the edge portions of the wet charge transport layer. Further, in the case of the gel electrolyte, there can be provided a method in which the gel electrolyte is applied wet and solidified by means of polymerization or the like. In this case, after the gel electrolyte has been dried and solidified, the counter electrode can be provided on the charge transport layer. As a method in which, besides an electrolyte solution, a wet organic positive hole transport material or a gel electrolyte is provided, it is possible to use a method which is similar to the aforementioned method in which the semiconductor particle layer or the dye is provided.

(D) Counter Electrode

In the same manner as the aforementioned conductive support, a counter electrode may be a single layer structure formed by a counter electrode conductive layer of a conductive material or may be structured by the counter electrode conductive layer and a supporting substrate. Examples of a conductive material used for the counter electrode conductive layer include: metals (such as platinum, gold, silver, copper, aluminum, magnesium, indium, and the like), carbons, or conductive metal oxides (indium-tin composite oxide, fluorine doped tin oxide, and the like). Among these, preferably, platinum, gold, silver, copper, aluminum, and magnesium can be used as the counter electrode. An example of a preferable supporting substrate of the counter electrode is glass or plastic, onto which the aforementioned conductive materials are applied or deposited, and used. Thickness of the counter conductive layer is not particularly limited. However, it is preferably 3 nm to 10 $\mu$m. The lower the surface resistance of the counter electrode layer the better. The range of the surface resistance is preferably no more than 50$\Omega$/□, and more preferably no more than 20$\Omega$/□.

As light can be irradiated from either or both of the conductive support and the counter electrode, in order to make the light reach the photosensitive layer, at least one of the conductive support and the counter electrode may be substantially transparent. In view of the improvement of generation efficiency, it is preferable to make the conductive support transparent to thereby allow light to be incident from the conductive support side. In this case, preferably, the counter electrode has a light reflective property. As such a counter electrode, there can be used glass or plastic with a metallic or conductive oxide deposited thereon, or a metallic film.

The counter electrode can be formed by applying, plating or depositing (PVD, CVD) a conductive material directly on the charge transport layer or by bonding a substrate having a conductive layer to the charge transport layer at the conductive layer side. Further, in the same manner as the case of the conductive support, especially in the case in which the counter electrode is transparent, it is preferable to use a metal lead in order to decrease the resistance of the counter electrode. Preferably, the metal lead is provided with a quality, an installation method, deterioration of an incidental light amount due to the installation thereof, and the like which are the same as those in the case of the conductive support.

(E) Other Layers

In order to prevent short circuits of the counter electrode and the conductive support, it is preferable to coat a compact film layer of a semiconductor as an undercoat layer between the conductive support and the photosensitive layer in advance. This is particularly effective when an electronic transport material or a positive hole transport material is used for the charge transport layer. The undercoat layer is preferably $TiO_2$, $SnO_2$, $Fe_2O_3$, $WO_3$, $ZnO$, or $Nb_2O_5$, and more preferably $TiO_2$. In addition to a spray pyrolysis method which is described, for example, in "Electrochim. Acta 40, 643–652" (1995), a sputtering method is used to coat the under coat layer. Thickness of the undercoating layer is preferably no more than 5 to 1000 nm or less, and more preferably 10 to 500 nm.

At the external side surface(s) of either or both of the conductive support which acts as an electrode and the counter electrode, between the conductive layer and the substrate, or at the intermediate portion of the substrate, there can be provided functional layers such as a protective layer, a reflection prevention layer, and the like. In order to form these functional layers, an application method, a deposition method, a bonding method, and the like can be used in accordance with a material used.

In the photoelectric chemical battery of the present invention, in order to prevent deterioration of each of the aforementioned structural substances, and volatilization of the contents thereof, preferably, the sides of the photoelectric chemical battery are sealed with a polymer, an adhesive, or the like.

Basically, the photoelectric chemical battery of the present invention is structured in the same manner as the aforementioned photoelectric conversion element. Namely, the photoelectric conversion element is connected to an external circuit via a lead or the like to thereby operate at the external circuit. As an external circuit itself which is connected to the conductive support and the counter electrode via a lead and the like, there can be used a known external circuit. Further, it is possible for the photoelectric chemical battery of the present invention to have a module structure which is basically the same as that of a conventional solar battery module. Generally, the solar battery module is structured such that a cell is formed on a support substrate of a metal, a ceramic or the like, the support substrate is covered with a filling resin, a protective glass or the like, and light is taken in from the opposite side of the support substrate. However, it is possible for a transparent material such as a tempered glass or the like to be used as the support substrate, and on the transparent support substrate is formed a cell, and light is taken in from the transparent support substrate side of the cell. More specifically, there are known module structures called super straight type, sub-straight type, or potting type, and a module structure which is integrated with substrate which is used for an amorphous silicone solar battery, or the like. In the photoelectric chemical battery of the present invention, these module structures can be selected in accordance with the purpose, the place, or the circumstance of the usage as necessary. More specifically, preferably, structures or aspects disclosed in JP-A No. 11-8457 can be applied to the present invention.

[Non-aqueous Secondary Battery]

A non-aqueous secondary battery of the present invention utilizing the electrolyte composition of the present invention will be explained hereinafter.

The non-aqueous secondary battery of the present invention is characterized in that it contains the electrolyte composition of the present invention. There is no large volume reduction in the non-aqueous secondary battery of the present invention which contains the electrolyte composition of the present invention and it exhibits an excellent cyclic performance.

When the electrolyte composition of the present invention is used for a non-aqueous secondary battery, a positive electrode active substance may be a transition metal oxide capable of reversible lithium ion insertion or discharge. However, a lithium containing transition metal oxide is particularly preferable. As a preferable lithium containing transition metal oxide positive electrode active substance, there can be used oxides including lithium containing Ti, V, Cr, Mn, Fe, Co, Ni, Cu, Mo, and W. Further, alkaline metals except lithium (such as elements of a first (IA) group and a second (IIA) group in a periodic table) and/or Al, Ga, In, Ge, Sn, Pb, Sb, Bi, Si, P, B and the like can be mixed. This mixture amount with respect to the transition metal is preferably from 0 to 30 mol %.

A more preferable lithium containing transition metal oxide positive electrode active substance used in the present invention is synthesized by mixing a lithium compound/a transition metal compound (in which the transition metal is at least one selected from Ti, V, Cr, Mn, Fe, Co, Ni, Cu, Mo, and W) such that a total mole ratio thereof is 0.3 to 2.2.

A particularly preferable lithium containing transition metal oxide positive electrode active substance used in the present invention is synthesized by mixing a lithium compound/a transition metal compound (in which the transition metal is at least one selected from V, Cr, Mn, Fe, Co, and Ni) such that the total mole ratio thereof is 0.3 to 2.2.

A particularly preferable lithium containing transition metal oxide positive electrode active substance used in the present invention is a material including $Li_gM^3O_2$ ($M^3$ is one or more selected from Co, Ni, Fe, and Mn, and g=0 to 1.2) or a material having a spinel structure represented by $Li_hM^4{}_2O_4$ ($M^4$ is Mn, h=0 to 2). Besides the transition metal, $M^3$ and $M^4$ can be Al, Ga, In, Ge, Sn, Pb, Sb, Bi, Si, P or B. This amount included is preferably 0 to 30 mol %.

Examples of a most preferable lithium containing transition metal oxide positive electrode active substance used in the present invention include: $Li_gCoO_2$, $Li_gNiO_2$, $Li_gMnO_2$, $Li_gCo_jNi_{(1-j)}O_2$, $Li_hMn_2O_4$, and the like (in which g=0.02 to 1.2, j=0.1 to 0.9). Here, the aforementioned value g is a value before electric charge/discharge starts, and the value varies in accordance with the electric charge/discharge.

A positive electrode active substance can be synthesized by a known method such as a method in which a lithium compound and a transition metal compound are mixed and burned, a solution reaction method or the like. However, a method of burning the lithium compound and the transition metal compound is particularly preferable.

A mean particle size of the positive electrode active substance used in the present invention is not particularly limited. However, the mean particle size is preferably 0.1 to 50 μm. A specific surface area of the positive electrode active substance is not particularly limited. However, the specific surface area is preferably 0.01 to 50 m² by BET method. pH of a supernatant liquid when 5 g of the positive electrode active substance was dissolved in a distilled water is preferably from 7 to 12.

For obtaining a predetermined particle size, a well known mill or classifier can be used. For example, there can be used a mortar, a ball mill, a vibration ball mill, a vibration mill, a satellite ball mill, a planet ball mill, a swirling airflow type jet mill, or a sieve. The positive electrode active substance which was obtained through burning can be used after being washed with water, an acidic solution, an alkaline solution, or an organic solvent.

One of negative electrode active substances used in the present invention is a carbonaceous material which can absorb/discharge lithium. The carbonaceous material is substantially formed by a carbon. As an example of the carbonaceous material, there can be used artificial graphite such as petroleum pitch, natural graphite, vapor phase epitaxic graphite or the like, and carbonaceous materials obtained by burning various synthetic resins such as a PAN (polyacrylonitrile) system resin, a furfuryl alcoholic resin, and the like. Further, there can be used various carbon fibers such as a PAN type carbon fiber, a cellulose type carbon fiber, a pitch type carbon fiber, a vapor phase epitaxic carbon fiber, a dehydrated PVA type carbon fiber, a lignin carbon fiber, a vitreous carbon fiber, and an active carbon fiber; mesophase micro spheres; graphite whiskers; flat plate graphite; and the like.

In accordance with a degree of graphitization, these carbonaceous materials can be divided into non-graphitized carbon materials and graphite system carbon materials. Further, it is preferable for the carbonaceous materials to have a spacing, a density, and a crystallite size disclosed in JP-A Nos. 62-22066, 2-6856, and 3-45473.

The carbonaceous material is not necessarily a single material, and instead, there can be used a mixture of natural graphite and artificial graphite which are disclosed in JP-A No. 5-90844, graphite disclosed in JP-A No. 6-4516 which has a coating layer, or the like.

Another example of the negative electrode active substance to be used in the present invention is an oxide and/or a calcogenide.

An amorphous oxide and/or a calcogenide are particularly preferable. The term "amorphous" as used herein describes an oxide which has a broad scattering having a vertex within a range of 20° to 40° at the value of 2θ using an X-ray diffraction method in which a CuKα line is used, and which may have crystalline diffracting lines. The strongest intensity of the crystalline diffracting lines which can be seen within a range of from 40° to 70° at the value of 2θ is preferably 100 times or less of the diffracting line intensity of a vertex of the broad scatterer which can be seen from 20° to 40° at the value of 2θ, more preferably 5 times or less, and particularly preferably the crystalline diffracting line is not used.

In the present invention, an amorphous oxide which is a semi-metal element and/or a calcogenide are particularly preferable. Namely, there can be selected an element from Group 13 (IIIB) to Group 15 (VB) of the periodic table, an oxide formed of one or a combination of two or more of Al, Ga, Si, Sn, Ge, Pb, Sb, and Bi, or a calcogenide.

For example, $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_3$, $Sb_2S_5$, and $SnSiS_3$ are preferable. Further, these can be a composite oxide formed with a lithium oxide such as $Li_2SnO_2$.

The negative electrode material of the present invention is preferably an amorphous oxide which is mainly Sn, Si, or G, and is more preferably represented by the following formula (6):

$$SnM^1_d M^2_e O_f$$

In formula (6), $M^1$ represents at least one element selected from Al, B, P and Ge, $M^2$ represents at least one element selected from group 1 (IA) elements, group 2 (IIA) elements, group 3 (IIIA) elements, and halogen elements of the periodic table, d represents a numeral from 0.2 to 2, and e represents a numeral from 0.01 to 1 i.e., 0.2<d+e<2, and f represents a numeral from 1 to 6.

As an amorphous oxide which is mainly formed by Sn, there can be used the following compounds. However, the present invention is not limited to these.

C-1 $SnSiO_3$
C-2 $Sn_{0.8}Al_{0.2}B_{0.3}P_{0.2}Si_{0.5}O_{3.6}$
C-3 $SnAl_{0.4}B_{0.5}Cs_{0.1}P_{0.5}O_{3.65}$
C-4 $SnAl_{0.4}B_{0.5}Mg_{0.1}P_{0.5}O_{3.7}$
C-5 $SnAl_{0.4}B_{0.4}Ba_{0.08}P_{0.4}O_{3.28}$
C-6 $SnAl_{0.4}B_{0.5}Ba_{0.08}Mg_{0.08}P_{0.3}O_{3.26}$
C-7 $SnAl_{0.1}B_{0.2}Ca_{0.1}P_{0.1}Si_{0.5}O_{3.1}$
C-8 $SnAl_{0.2}B_{0.4}Si_{0.4}O_{2.7}$
C-9 $SnAl_{0.2}B_{0.1}Mg_{0.1}P_{0.1}Si_{0.5}O_{2.6}$
C-10 $SnAl_{0.3}B_{0.4}P_{0.2}Si_{0.5}O_{3.55}$
C-11 $SnAl_{0.3}B_{0.4}P_{0.5}Si_{0.5}O_{4.3}$
C-12 $SnAl_{0.1}B_{0.1}P_{0.3}Si_{0.6}O_{3.25}$
C-13 $SnAl_{0.1}B_{0.1}Ba_{0.2}P_{0.1}Si_{0.6}O_{2.95}$
C-14 $SnAl_{0.1}B_{0.1}Ca_{0.2}P_{0.1}Si_{0.6}O_{2.95}$
C-15 $SnAl_{0.4}B_{0.2}Mg_{0.1}Si_{0.6}O_{3.2}$
C-16 $SnAl_{0.1}B_{0.3}P_{0.1}Si_{0.5}O_{3.05}$
C-17 $SnB_{0.1}K_{0.5}P_{0.1}SiO_{3.65}$
C-18 $SnB_{0.5}F_{0.1}Mg_{0.1}P_{0.5}O_{3.05}$

The amorphous oxide and/or the calcogenide of the present invention can be produced either by a burning method or a solution reaction method. However, the burning method is more preferable. In the burning method, after the completion of a sufficient mixture of an oxide, a calcogenide and a compound of a corresponding element, preferably, the mixture is burned, whereby an amorphous oxide and/or a calcogenide can be obtained. These can be produced by using an already known method.

A mean particle size of the negative electrode materials used for the present invention is preferably 0.6 to 60 μm. For obtaining a predetermined particle size, a well known mill or classifier is used. For example, there can be used a mortar, a ball mill, a sand mill, a vibration ball mill, a satellite ball mill, a planet ball mill, a swirling airflow type jet mill, a sieve or the like. During the milling of the negative electrode materials, as necessary, it is possible to carry out wet milling in which water or an organic solvent such as methanol is made to exist at the same time with the negative electrode material. For obtaining a predetermined particle diameter, it is preferable to separate the particles into different size. A method for doing this is not particularly limited, and as necessary, it is possible to use a sieve, a pneumatic separator or the like. The present invention can employ both wet and dry separations.

Examples of negative electrode materials which are to be used in combination with an amorphous oxide negative electrode material mainly including Sn, Si, or Ge are: a carbon material which can absorb/discharge a lithium ion or a lithium metal, or lithium, a lithium alloy, and a metal which can be alloyed with lithium.

An aprotic organic solvent is added to an electrode mixture of the present invention in addition to a conductive agent, a binder or a filler.

For the conductive agent, any electronic conductive material which does not cause chemical change in a battery in which it is included is acceptable. Ordinarily, there can be contained one conductive material or a mixture of conductive materials such as natural graphite (such as lepidic graphite, flaky graphite or soiled graphite), artificial graphite, carbon black, acetylene black, ketene black, carbon fibers or metal powder (such as copper, nickel, aluminum, or silver (disclosed in JP-A No. 63-148554)), or metal fibers or polyphenylene derivatives (disclosed in JP-A No. 59-20971). A combined use of graphite and acetylene black is particularly preferable. The amount in which graphite and acetylene black are added is preferably 1 to 50 mass %, and more preferably 2 to 30 mass %. In the case of carbon or graphite, the amount in which it is added is preferably 2 to 15 mass %.

In the present invention, it is possible to use a binder in order to maintain the electrode mixture. As an example of the binder, there can be used a polysaccharide, a thermoplastic resin, and a polymer which has rubber elasticity. Preferable examples of the binders include: water soluble polymers such as starch, carboxymethylcellulose, cellulose, diacetylcellulose, methylcellulose, hydroxyethylcellulose, hydroxypropylcellulose, sodium alginate, polyacrylic acid, polyacrylate, polyvinylphenol, polyvinylmethylether, polyvinylalcohol, polyvinyl pyrolidone, polyacrylnitrile, polyacrylamide, polyhydroxy (metha) acrylate, or stylene-maleic acid copolymer; polyvinylchloride, polytetrafluoroethylene, polyvinylidene fluoride, tetrafluoroethylene-hexafluoroethylene-hexafluoropropylene copolymer; (meta) acrylic acid copolymers containing meta acrylic acidic esters such as polyethylene, polypropylene, ethylene-propylene-gender polymer (EPDM), sulfonated EPDM, polyvinyl acetal resin, methyl metacrylate, or 2-ethylhexylacrylate; (meta) acrylate-acrylonitrile copolymer, polyvinyl ester copolymers containing vinyl esters such as vinyl acdetate; stylene-butadiene copolymers; acrylonitrile-butadiene copolymers; emulsion (latex) or suspension such as polybutadiene, neoprene rubber, fluoro rubber, polyethylene oxide, polyester polyurethane resin, polyether polyurethane resin, polycarbonate polyurethane resin, polyester resin, phenol resin, or epoxy resin. Particularly, there can be used polyacrylate ester system latex, carboxymethylcellulose, polytetrafluoroethylene, and polyfluorovinylidene.

These binders can be used singly or in combination. When a small amount of the binder is added, the force for holding the electrode mixture together or aggregation of the electrode mixture deteriorates. When the amount in which the binder is added is too large, the volume of an electrode is increased so that the capacity per unit volume or mass may decrease. As such, the amount in which the binder is added is preferably 1 to 30 mass %, and more preferably 2 to 10 mass %.

For the filler, there can be used any fibrous material which does not cause a chemical change in a battery in which it is included. Ordinarily, there can be used olefin system polymer such as polypropylene or polyethylene and fiber such as glass or carbon. The amount in which the filler is added is not particularly limited. However, it is preferably 0 to 30 mass %.

In order to ensure safety, it is possible to use the electrolyte composition of the present invention in combination with a separator. The separator which ensures safety and which is used in combination with the electrolyte composition of the present invention must function to block the above-described air gap, increase a resistance, and interrupt a current. The blocking temperature is preferably from 90° C. to 180° C.

Usually, pores of the separator are formed into a circular or ellipsoidal shape, and the size of a pore is from 0.05 to 30 μm, and preferably from 0.1 to 20 μm. Otherwise, as in a case in which the separator is made by a drawing method or a phase separation method, the pore of the separator may be formed in a bar shape or may have an arbitrary shape. A ratio of air gaps in the separator i.e., a porosity of the separator is 20 to 90%, and preferably 35 to 80%.

The separator can be formed by a single material such as polyethylene or polypropylene or by two composite materials or more. Use of a separator in which two kinds or more of micro-porous films having different porous diameters, porosities or porous blocking temperatures are laminated is particularly preferable.

For a positive or negative electrode collector is used an electronic conductor which does not allow any chemical change in a constituted battery.

As a positive electrode collector, besides aluminum, stainless steel, nickel, titanium or the like, use of a collector of aluminum or stainless steel whose surface is treated with carbon, nickel, titanium or silver is preferable, and use of aluminum or an aluminum alloy is more preferable.

As a negative electrode collector, use of copper, stainless steel, nickel or titanium is preferable, and use of copper or copper alloy is more preferable.

The electrode collector used is, usually, one having a film sheet configuration. However, the collector may be configured as a net, a punch, a lath body, a porous body, a foaming body, a compact of fiber groups or the like. Thickness of the collector is not particularly limited, but it is usually 1 to 500 μm. Further, it is desirable that a surface treatment is applied to indent the surface of a collector.

A battery configuration can be a sheet form as well as a square, a cylinder, or the like. A mixture of the positive electrode active substance and the negative electrode material is coated on a collector, dried, compressed and used. Examples of a coating method include a reverse roll method, a direct roll method, a blade method, a knife method, an extrusion method, a curtain method, a gravure method, a bar method, a dip method and a squeeze method. Among these, the blade method, the knife method, and the extrusion method are preferably used. Coating is preferably carried out at the speed of 0.1 to 100 m/min. At this point, a coating method is selected from the above-described coating methods in accordance with physical properties of the solution and dryness of the mixture. As a result, a coating layer may have excellent surface conditions. Coating is performed on one side of the layer after the other or simultaneously on both sides.

The coating may be successive, sequential, intermittent, or striped. Thickness, length or width of the coating layer is determined by the shape or the size of the battery. However, the thickness of one side of the coating layer is preferably 1 to 2000 μm in a state of being compressed after the drying.

As a method of drying and dehydrating a substance to be coated on an electrode sheet, a method in which hot air, vacuum, infrared rays, far infrared radiation, electronic wire, and low humid air are used singly or in combination. The temperature at which the substance is dried is preferably from 80 to 350° C., and particularly preferably from 100 to 250° C. The moisture content in the entire body of a battery is preferably 2000 ppm or less, while the moisture content in each of the positive electrode mixture, the negative electrode mixture or the electrolyte is preferably 500 ppm or less. As a sheet pressing method, a method in general use can be used. However, a calender pressing method is particularly preferable. A pressing pressure is not particularly limited. It is however, preferably 0.2 to 3t/cm². A pressing velosity of the calender pressing method is preferably 0.1 to 50 m/min. A pressing temperature is preferably from room temperature to 200° C. A ratio of positive electrode sheet width to a negative electrode sheet width is preferably 0.9 to 1.1, and particularly preferably 0.95 to 1.0. A content ratio of the negative electrode substance to the negative electrode material varies in accordance with the compound type or the mixture formulation.

The positive electrode sheet and the negative electrode sheet are laminated to each other via the separator. The laminated sheets are processed into a sheet type battery as they are. Or the laminated sheets are folded and then inserted into a rectangular can. The sheets and the rectangular can are electrically connected to each other. Into this is injected the electrolyte composition of the present invention so that a rectangular battery is formed by using a sealing plate. Further, after the negative electrode sheet and positive electrode sheet are laminated via the separator and rolled, they are inserted into a cylindrical can. The sheet and the cylindrical can are electrically connected to each other. Into this is injected the electrolyte composition of the present invention so that a cylinder battery is formed by using a sealing plate. At this point, a safety valve can be used as the sealing plate. Besides the safety valve, conventionally known various safety elements can be provided. For example, as an overcurrent protection element, there can be used a fuse, a bimetal, a PTC element or the like.

Increase in the internal pressure of a battery can be prevented by slitting the battery can, cracking the gasket, cracking the sealing plate, or cutting the battery can with a lead plate. Further, a charging device may contain a protection circuit which can prevent excessive charge or discharge, or said protection circuit may be provided separately an then connected to the charging device.

Overcharge can be prevented by interrupting current flow by increasing the pressure of the battery. A compound for increasing the internal pressure of the battery in a mixture, or an electrolyte may be included. Examples of the compound which is used for increasing the internal pressure include: carbonates such as $Li_2CO_3$, $LiHCO_3$, $Na_2CO_3$, $NaHCO_3$, $Ca_2CO_3$, $MgCO_3$, and the like.

As a can or a lead plate, there can be used a metal or an alloy which has electric conductivity. For example, there can be used metals such as iron, nickel, titanium, chromium, molybdenum, copper, and aluminum, or an alloy thereof.

As a welding method of a cap, a can, a sheet, and a lead plate, there can be used a known method (for example, a DC or an AC electric welding, a laser welding, an ultrasonic welding or the like). As a sealant for sealing, there can be used a conventionally known compound or mixture such as asphalt.

Use application of a non-aqueous secondary battery is not particularly limited. However, the non-aqueous secondary battery is built into electronics such as a notebook personal computer, a pen input personal computer, a mobile personal computer, an electronic book player, a cellular phone, a cordless telephone element set, a pager, a handy terminal, a cellular phone facsimile, a cellular phone copy, a cellular phone printer, a head phone stereo, a video movie, a liquid crystal TV, a handy cleaner, a portable CD, a minidisk, an electric shaver, a transceiver, an electronic notebook, a desk calculator, a memory card, a cellular tape recorder, a radio, and a back-up power. Besides the electronics, the non-aqueous secondary battery is built into consumer appliances such as an automobile, a motor car, a motor, a lighting equipment, a toy, a game machine, a road conditioner, a watch, a stroboscope, a camera, a medical equipment (a pace maker, a hearing aid, a massager, and the like). Further, the non-aqueous secondary battery can be used for war or space supply. Moreover, the non-aqueous secondary battery can be used in combination with a solar battery.

EXAMPLES

The present invention will be explained in more detail through examples, hereinafter.

Example 1
Synthesis of Salt
1. Synthesis of F-9 and F-10

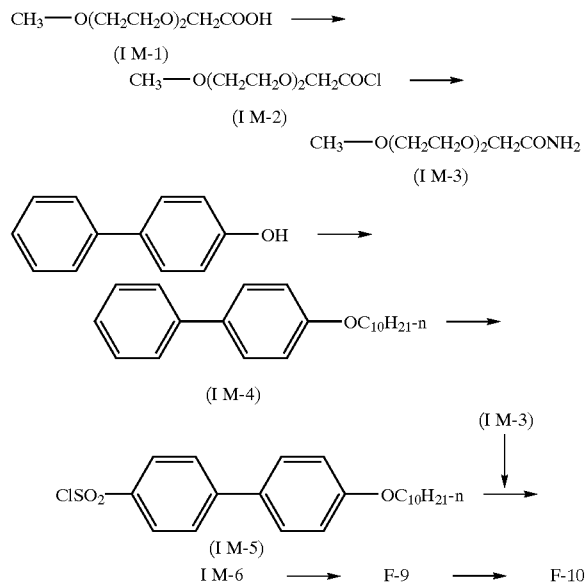

1-1. Synthesis of an Intermediate IM-2

IM-1 (53.5 g, 300 mmol) was dissolved in methylene chloride (150 ml). To this was added a solution of thionyl chloride (28 ml, 380 mmol)/methylene chloride (50 ml), and the mixture was heated and refluxed for 4 hours. After completion of the cooling, to this was added water (30ml), and the mixture was extracted with methylene chloride, and the extracted mixture was concentrated to obtain IM-2 (54 g).

1-2. Synthesis of an Intermediate IM-3

Into toluene (60 ml) was dissolved IM-2 (54 g, 275 mmol) obtained as described above. To this was added 28% aqueous ammonia (150 ml) on an ice bath. Three hours later, this mixture was neutralized with 10% water hydrochloride, and extracted with ethyl acetate. After completion of the drying of the extracted solution with magnesium sulfate, this was concentrated, and refined with silica gel column chromatography (methylene chloride/methanol) to obtain 28 g of IM-3.

1-3. Synthesis of an Intermediate IM-4

Into dimethylformamide (300 ml) was dissolved 4-hydroxyphenylphenol (30 g, 176 mmol). To this was charged potassium carbonate (73 g). To this mixture 1-bromodecan (40.9 g, 185 mmol) was added dropwise while it was being heated to the temperature of 80° C. and stirred. After completion of the heating and the stirring for three hours, the reaction mixture was poured into water (500 ml), and the separated crystals were filtrated. The obtained rough crystals were re-crystallized with acetonitrile to obtain 50.4 g of IM-4.

1-4. Synthesis of an Intermediate IM-5

Into methylene chloride (83 ml) was dissolved the resultant IM-4 (25 g, 80.5 mmol) obtained as described above, and to this was added dropwise chlorosulfonic acid (8.3 ml) at room temperature. After this mixture was stirred for an hour at room temperature, to the reaction system were added dropwise at a low speed dimethylacetoamide (90 ml)/acetonitrile (45 ml). To this was added dropwise oxy-salt phosphor (15 ml) while being heated and refluxed. After this mixture was heated and refluxed for an hour, hexane (150 ml) was added, then, the mixture was stirred and stood still, and thereafter, the upper layer of hexane was separated and concentrated. The concentrated substances were refined with silica gel column chromatography to obtain 21 g of IM-5.

1-5. Synthesis of an Intermediate IM-6

Into dimethylacetoamide (30 ml) was dispersed sodium hydroxide (content: 60%, 0.88 g, 22 mmol). To this were added IM-3 obtained in Example 1-2 (1.77 g, 10 mmol)/dimethylacetoamide (5 ml). This mixture was stirred for 10 minutes, then, to this was added IM-5 (4.5 g, 11 mmol) obtained as described above, and this mixture was stirred for three hours. To this was added water (10 ml), and this mixture was acidified with 1N water hydrochloride, and the reaction solution was concentrated. The concentrated mixture was refined with silica gel column chromatography to obtain 2.8 g of IM-6.

1-6. Synthesis of F-9

Into tetrahydrofuran (20 ml) was dissolved the resultant IM-6 (2.2 g, 4 mmol) obtained as described above, and to this were added a solution of LiOH (0.96 mg, 4 mmol)/water (5 ml). The reaction mixture was concentrated, to this was added tetrahydrofuran (20 ml), and undissolved substances in this mixture were filtrated, then, the mixture was further concentrated and dried under a reduced pressure (60° C., 1 mmHg) to obtain the target F-9 (2.2 g) in solid form. The structure was confirmed at 1H-NMR.

1-7. Synthesis of F-10

Into methylene chloride (10 ml)/water (10 ml) was dissolved 1-ethyl-3-methylimidazoliumiodide (0.67 g, 2.8 mmol), to this was charged F-9 (1.55 g, 2.8 mmol), and this mixture was stirred. After a methylene chloride phase was separated and concentrated, the mixture was refined with silica gel column chromatography to obtain F-10 (1.8 g) as a colorless oil.

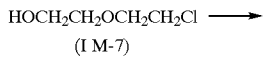

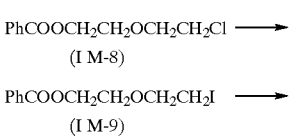

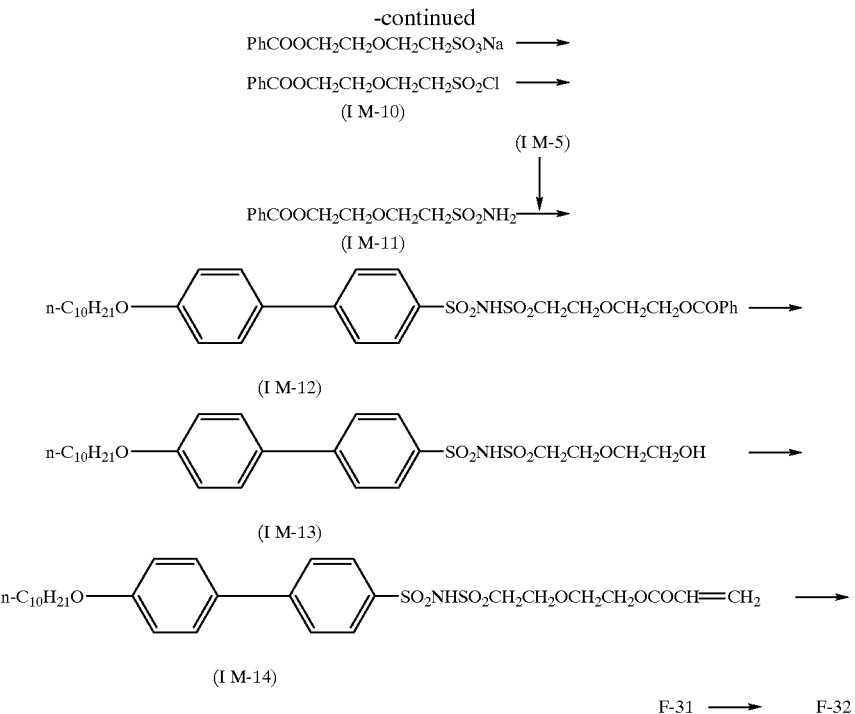

2-1. Synthesis of IM-8

Into a methylene chloride (500 ml)/a triethylamine (11 g, 1.1 mol) was dissolved IM-7 (124.6 g, 1 mol). Benzoyl chloride (140.6 g, 1 mol) was added dropwise at room temperature. After the mixture was stirred for four hours, water (100 ml) and an aqueous 5% NaOH solution (50 ml) were added, then, the mixture was separated. After a methylene chloride layer was dried with magnesium sulfate, it was concentrated, then, distillated under a reduced pressure (150 to 160° C., 6 mmHg) to obtain 42 g of IM-8.

2-2. Synthesis of IM-9

Into ethyl acetate was dissolved IM-8 (42 g) which was obtained as described above. NaI (42.5 g) was added. This mixture was refluxed for three hours. The reaction mixture was concentrated, and then refined with silica gel column chromatography (ethyl acetate/hexane) to obtain 36.3 g of IM-9.

2-3. Synthesis of IM-10

Into ethanol (100 ml) was dissolved IM-9 (35 g, 110 mol) obtained as described above. To this were added $Na_2SO_3$ (18 g)/water (150 ml). After this mixture was heated and refluxed for 12 hours, the reaction mixture was concentrated under a reduced pressure (140° C., 6 mmHg). To the concentrated substances were charged toluene (250 ml) and dimethylformamide (3.5 ml). To this mixture was added a thionyl chloride (22 ml). After this was heated and refluxed for 8 hours, the reaction mixture was poured into ice water (250 ml), and extracted three times with a methylene chloride. After the extracted solution was dried with magnesium sulfate, the methylene chloride was concentrated, then, refined with silica gel column chromatography (ethyl acetate/hexane) to obtain 17 g of IM-10.

2-4. Synthesis of IM-11

Into methylene chloride (50 ml) was dissolved the resultant IM-10 (12 g, 41 mmol) obtained as described above. To this was added 28% ammonium water (22 ml). After this mixture was stirred for three hours, this was extracted twice with methylene chloride. After the extracted solution was dried with magnesium sulfate, methylene chloride was concentrated and then refined with silica gel column chromatography (ethyl acetate/hexane) to obtain 6.6 g of IM-11.

2-5. Synthesis of IM-12

Into toluene (40 ml) was dispersed sodium hydroxide (the content: 60%, 0.96 g, 24 mmol). To this were added IM-11 (6.6 g, 24 mmol)/toluene (10 ml). After this mixture was stirred for 30 minutes, to this were added IM-5 (9.8 g, 24 mmol)/toluene (50 ml). This mixture was heated and refluxed for three hours. After the reaction mixture was concentrated, to this were added methylene chloride (50 ml), ethyl acetate (100 ml), methanol (30 ml), and water (50 ml). This mixture was separated, an organic layer was dried with magnesium sulfate, then, this was concentrated to obtain 8.2 g of IM-12.

2-6. Synthesis of IM-13

Into 40% NaOH water (10 ml)/methanol (20 ml) was added IM-12 which was obtained as described above (1.5 g, 2.3 mmol), and this was heated and refluxed for three hours. The reaction mixture was extracted with methylene chloride. After the extracted solution was dried with magnesium sulfate, methylene chloride was concentrated, then, refined with silica gel column chromatography (methylene chloride/methanol) to obtain 1.2 g of IM-13.

2-7. Synthesis of IM-14

Into tetrahydrofuran (5 ml)/triethylamine (2.2 ml) was dissolved IM-13 (0.34 g, 0.6 mmol) obtained as described above. To this was added acrylic chloride (1 ml, 1.2 mmol) at the temperature of 0° C. After this mixture was stirred for two hours at room temperature, it was concentrated, then, refined with silica gel column chromatography (methylene chloride/methanol) to obtain 0.32 g of IM-14.

2-8. Synthesis of F-31

Into tetrahydrofuran (5 ml) was dissolved IM-14 (40 mg, 0.067 mmol) obtained as described above. To this was added a solution of LiOH (1.6 mg, 0.067 mmol)/water (2 ml). The reaction mixture was concentrated. To this was charged tetrahydrofuran (10 ml). After undissolved substances were filtrated, this mixture was further concentrated, then, dried under a reduced pressure (50° C., 6 mmHg) to obtain the target F-31 (38 mg). The structure was confirmed at 1H-NMR.

2-9. Synthesis of F-32

F-31 obtained as described above was used to obtain F-32 in the same manner as Example 1–7.

Example 2

2. Production of a Photoelectric Chemical Battery 2-1. Preparation of a Titanium Dioxide Dispersion Solution Into a stainless vessel which has a capacity of 200 ml and whose inside is teflon-coated were charged titanium dioxide (Degussa P-25 manufactured by Nippon Aero Gel Co., Ltd.) (15 g), water (45 g), a dispersion agent (Triton X-100 manufactured by Aldrich Inc.) (1 g), and zirconia beads which have a diameter of 0.5 mm (manufactured by Nikkato Co., Ltd.) (30 g). This mixture was dispersed by using a sand grinder mill (manufactured by Aimex Inc.) over a period of 2 hours at 1500 r.p.m. Then, from the dispersed substances, zirconia beads were filtrated. The mean particle diameter of titanium dioxide at this time was 2.5 $\mu$m. This particle diameter at this time was measured by Master Sizer manufactured by Malvern Co., Ltd.

2-2. Production of a $TiO_2$ Electrode (Electrode A) to Which Dye Was Adsorbed

By using a glass bar, the above-described dispersion solution was coated on an electrically conductive glass with which a fluorine-doped tin oxide was coated (e.g., TCO glass-U manufactured by Asahi Glass Co., Ltd. and cut into 20 mm×20 mm) at an electrically conductive surface side thereof. At this point, an adhesive tape was bonded to a portion of the electrically conductive glass at the electrically conductive surface side (at an interval of 3 mm from each end of the glass), and allowed to serve as a spacer. Sheets of glass were lined up such that the adhesive tape would be placed at both ends of each glass and eight sheets of glass were coated at one time. After completion of the coating, the adhesive tape was stripped from each sheet glass, the glass was air-dried at room temperature over a period of a day. Next, this glass was put in an electric furnace (Maffle furnace FP-32 manufactured by Yamato Kagaku Co., Ltd.), and burned at the temperature of 450° C. over a period of 30 minutes. After this glass was taken out and cooled, it was immersed into a dye R-1 ethanol solution (3×10-4 mol/liter) over a period of 3 hours. After the dye-colored glass was immersed into 4-tert-butylpyridine over a period of 15 minutes, it was washed with ethanol, and air-dried. The thickness of the photosensitive layer thus obtained was 10 $\mu$m. The coating amount of semiconductor particles was 20 $g/m^2$. Further, the surface resistance of the electrically conductive glass was about 30$\Omega$/□.

2-3. Production of a Photoelectric Chemical Battery

On the dye-sensitized $TiO_2$ electrode substrate (1 cm×1 cm) thus produced was coated an acetonitrile solution (acetonitrile was added in the same mass amount as the composition) of electrolyte compositions (E-102 to E-120) each of which has such a composition as indicated in table 2 below. From this was removed acetonitrile while soaked in the $TiO_2$ electrode at the temperature of 60° C. and under a reduced pressure (an electrolyte having a polymerization group is to be removed after polymerization thereof occurs under conditions indicated in table 2 below). To these electrodes was overlapped a platinum evaporation glass which is of the same size as those electrodes to thereby obtain photoelectric chemical batteries (samples P-102 to 120). Further, with regard to an electrolyte solution using a solvent (E-101 in table 2), after completion of the overlapping of a dye-sensitized $TiO_2$ electrode substrate (2 cm×2 cm) which is the same as the above-described $TiO_2$ electrode substrate, to a platinum evaporation glass which is of the same size as the electrodes thereof, this E-101 electrolyte solution was soaked in an air gap between both glasses through a capillary action to thereby produce a photoelectric chemical battery (sample P-101). Moreover, the structures of RE-1, RE-2 and I-1 which were used for comparative examples of electrolytes in place of the salt of the present invention in Table 2 will be described hereinafter.

TABLE 2

Composition of electrolytes and conditions of polymerization

| Electrolyte compositions | composition (mass %) | polymerization treatment | sample | remarks |
|---|---|---|---|---|
| E-101 | $(C_4H_9)_4N^+1^-(48)$/BCE(50)/$1_2$(2) | not applied | P-101 | comparative example |
| E-102 | $(C_4H_9)_4N^+1^-(48)$/RE-1(50)/$1_2$(2) | not applied | P-102 | comparative example |
| E-103 | 1-1(48)/RE-1(50)/$1_2$(2) | not applied | P-103 | comparative example |
| E-104 | 1-1(48)/RE-1(43)/RE-2(5)/$1_2$(2)/BIS(1)/DMAIB(1) | 80° C. and 1 hour | P-104 | comparative example |
| E-105 | $(C_4H_9)_4N^+1^-(48)$/F-2(50)/$1_2$(2) | not applied | P-105 | present invention |
| E-106 | 1-1(48)/F-2(50)/$1_2$(2) | not applied | P-106 | present invention |
| E-107 | 1-1(48)/F-10(50)/$1_2$(2) | not applied | P-107 | present invention |
| E-108 | 1-1(48)/F-12(50)/$1_2$(2) | not applied | P-108 | present invention |
| E-109 | 1-1(48)/F-16(50)/$1_2$(2) | not applied | P-109 | present invention |
| E-110 | 1-1(48)/F-17(50)/$1_2$(2) | not applied | P-110 | present invention |
| E-111 | 1-1(48)/F-24(50)/$1_2$(2) | not applied | P-111 | present |

TABLE 2-continued

Composition of electrolytes and conditions of polymerization

| Electrolyte compositions | composition (mass %) | polymerization treatment | sample | remarks |
|---|---|---|---|---|
| E-112 | 1-1(48)/F-29(48)/I$_2$(2)/BIS(1)/DMAIB(1) | 80° C. and 1 hour | P-112 | present invention |
| E-113 | 1-1(48)/F-10(43)/F-29(5)/I$_2$(2)/BIS(1)/DMAIB(1) | 80° C. and 1 hour | P-113 | present invention |
| E-114 | 1-1(48)/F-10(43)/F-32(5)/I$_2$(2)/BIS(1)/DMAIB(1) | 80° C. and 1 hour | P-114 | present invention |
| E-115 | 1-1(48)/F-10(43)/F-33(5)/I$_2$(2)/Irg 907(1)/DET(1) | 5° C. and UV irradiation of UV for 20 min. | P-115 | present invention |
| E-116 | D-1a(48)/F-39(50)/I$_2$(2) | not applied | P-116 | present invention |
| E-117 | D-1a(48)/F-42(50)/I$_2$(2) | not applied | P-117 | present invention |
| E-118 | D-3a(48)/F-39(50)/I$_2$(2) | not applied | P-118 | present invention |
| E-119 | D-3a(48)/F-42(50)/I$_2$(2) | not applied | P-119 | present invention |
| E-120 | D-6a(48)/F-45(50)/I$_2$(2) | not applied | P-120 | present invention |

BCE (solvent): biscyanoethylether
DMAIB (heat polymerization initiator): dimethyl 2,2'-azo bis isobutylate
Irg907 (light polymerization initiator): irgaqua 907 (manufactured by Chiba Gaigie Co., Ltd.)
DET (sensitizer): diethylthioxanthone
BIS (cross linking agent): Biscoat#335(manufactured by Osaka Organic Industrial Co., Ltd.)

(RE-1)

$H_3C-N^{\oplus}{=}\!\!=\!\!N-CH_2CH_3$
$^{\ominus}N(SO_2CF_3)_2$ (RE-2)

$H_3C-N^{\oplus}{=}\!\!=\!\!N-CH_2CH_2O-\overset{O}{\underset{\|}{C}}-CH{=}CH_2$
$^{\ominus}N(SO_2CF_3)_2$ (I-1)

$H_3C-N^{\oplus}{=}\!\!=\!\!N-C_4H_9\text{-}n$
$I^{\ominus}$

2-4. Measurement of Photoelectric Conversion Efficiency

Light of a 500 W xenon lamp (manufactured by Ushio) was transmitted through an AM 1.5 filter (manufactured by Oriel Inc.) and a sharp cut filter (KenkoL-41), whereby simulated sunlight excluding ultraviolet was generated and the light intensity was adjusted to 30 mW/cm$^2$.

To each of the electrically conductive glass and the plastic evaporation glass of the aforementioned photoelectric chemical battery was connected a crocodile clip. Onto the glass sheets was irradiated simulated sunlight at the temperature of 70° C. The electricity thus generated was measured by a current-voltage measuring device (a Kaselay SMU 238 type). An open voltage (Voc); a short-circuit current density (Jsc); a form factor (FF)[=maximum output/(open voltage×short-circuit current)]; and a conversion efficiency (η) and an isothermic and hygrostat (60° C., 70% R. H.) were thus measured, and the deterioration rate, under these conditions, of a short-circuit current density over a period of 400 hours is totally indicated in Table 3 below.

TABLE 3

Photoelectric Conversion Efficiency

| Sample | Jsc (mA/m$^2$) | Voc (V) | FF | η (%) | decrease ratio of Jsc % | remarks |
|---|---|---|---|---|---|---|
| P-101 | 4.1 | 0.60 | 0.65 | 5.3 | 99 | comparative example |
| P-102 | 2.1 | 0.56 | 0.54 | 2.1 | 25 | comparative example |
| P-103 | 3.1 | 0.54 | 0.56 | 3.1 | 22 | comparative example |
| P-104 | 2.4 | 0.63 | 0.56 | 2.8 | 3 | comparative example |
| P-105 | 4.3 | 0.60 | 0.63 | 5.4 | 6 | present invention |
| P-106 | 4.5 | 0.62 | 0.65 | 6.0 | 10 | present invention |
| P-107 | 4.7 | 0.62 | 0.63 | 6.1 | 6 | present invention |
| P-108 | 4.3 | 0.64 | 0.63 | 5.8 | 8 | present invention |
| P-109 | 4.3 | 0.62 | 0.61 | 5.4 | 6 | present invention |
| P-110 | 4.2 | 0.57 | 0.62 | 4.9 | 9 | present invention |
| P-111 | 4.5 | 0.63 | 0.63 | 6.0 | 7 | present invention |
| P-112 | 3.8 | 0.64 | 0.63 | 5.1 | 2 | present invention |
| P-113 | 3.6 | 0.65 | 0.59 | 4.6 | 3 | present invention |
| P-114 | 3.6 | 0.63 | 0.63 | 4.8 | 2 | present invention |
| P-115 | 3.5 | 0.66 | 0.63 | 4.6 | 2 | present invention |
| P-116 | 3.6 | 0.6 | 0.61 | 4.4 | 2 | present invention |
| P-117 | 3.7 | 0.62 | 0.6 | 4.6 | 3 | present invention |

TABLE 3-continued

| | | | | | decrease | |
| Sample | Jsc (mA/m²) | Voc (V) | FF | η (%) | ratio of Jsc % | remarks |
|---|---|---|---|---|---|---|
| P-118 | 3.7 | 0.62 | 0.59 | 4.5 | 3 | present invention |
| P-119 | 3.5 | 0.63 | 0.62 | 4.5 | 2 | present invention |
| P-120 | 3.6 | 0.65 | 0.61 | 4.7 | 2 | present invention |

Jsc: short-circuit current density, and the decrease ratio thereof was metered when left for 400 hours at the temperature of 80° C. and at the humidity of 70 %
Voc: open voltage
FF: form factor
η: conversion efficiency The photoelectric chemical battery (P-101) which contains an electrolyte for a comparative example, using a solvent has low initial performance, whereby the solvent is volatilized, and the durability of this battery noticeably deteriorates. Further, although deterioration of batteries with passage of time (P-102, P-103, and P-104) using electrolyte compositions for comparative examples was minimum, the photoelectric conversion performance was not satisfactory. On the contrary, the photoelectric chemical batteries described in Examples in which the photoelectric chemical batteries of the present invention were used were excellent both in initial performance such as short-circuit current density, conversion efficiency or the like, and durability. Such effects could be recognized whatever dye was used.

Example 3
3. Production of a Lithium Secondary Battery
3-1. Production of a Positive Electrode Sheet As positive electrode active substances, 43 parts by mass of $LiCoO_2$, 2 parts by mass of scale-shaped graphites, 2 parts by mass of acetylene black were charged, and as a binder, 3 parts by mass of polyacrylonitrile was charged, and they were kneaded by using 100 parts by mass of acrylonitrile as a medium to obtain a slurry. The slurry thus obtained was coated on an aluminum foil whose thickness is 20 μm, by using an extrusion coater, and dried. After the drying, this was compressed and molded by a calendering press machine. Then, to the ends of this positive electrode sheet was welded an aluminum lead plate to thereby produce a positive electrode sheet having thickness of 95 μm, and width 54 mm×length 49 mm.

3-2. Production of a Negative Electrode Sheet 43 parts by mass of methophase pitch system carbon materials (manufactured by Petoka Inc.) as a negative electrode active substance and 2 parts by mass of acetylene black and 2 parts by mass of graphite as a conductive agent were mixed in this ratio, to this was charged 3 parts by mass of Gil polyacrylonitrile as a binder, and this mixture was kneaded by using 100 parts by mass of N-methylpyrolidone as a medium to obtain a negative electrode mixture slurry.

The negative electrode mixture slurry thus obtained was coated by an extrusion coater on a copper foil having a thickness of 10 μm, and dried. After the drying, this was compressed and molded by a calendering press machine to thereby produce a positive sheet having thickness of 46 μm and width 55 mm×length 50 mm. After the ends of the negative electrode sheet were welded by a nickel lead plate, heat treatment was performed on this sheet at the temperature of 230° C. for an hour, in dry air whose dew point is −40° C. or more, and by using a far infrared radiation heater.

3-3. Production of a Sheet Type Battery

Figure 2:
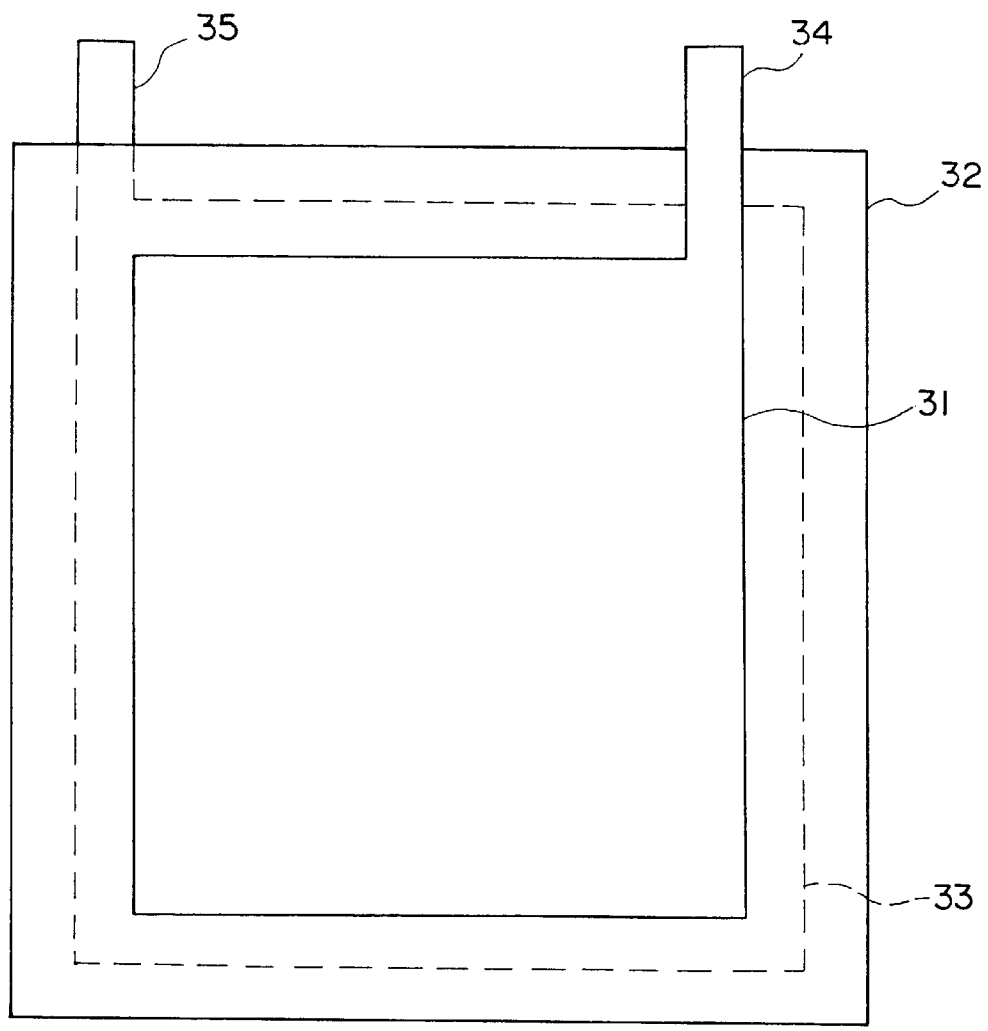
FIG. 2 is a view illustrating the structure of a sheet type battery produced in Example 3.

Each of the negative electrode sheet and the positive electrode sheet was dehydration-dried at the temperature of 230° C. over a period of 30 minutes in dry air at the dew point of −40° C. or less. In a dry atmosphere, a positive electrode sheet for which the dehydration drying has been completed and which has width 54 mm×length 49 mm, a separator (polyethylene porous film) which was cut to width 60 mm×length 60 mm, and a non-woven fabric were laminated to one another. On the non-woven fabric was coated a solution in which an electrolyte (E-202 to 215) having a composition indicated in table 4 was dissolved on acetonitrile of the same amount as the electrolyte, and from this solution was removed acetonitrile under a reduced pressure at the temperature of 50° C. Further, the electrolyte (E-201) using a solvent was soaked in the non-woven fabric. As shown in table 4, heat polymerization was carried out depending on the electrolyte employed. On this was laminated a negative electrode sheet for which the dehydration-drying has been completed and which has width 55 mm×length 50 mm. Four ends of this laminated sheet were heat-molten and sealed under a vacuum by using an exterior dressing material which is formed by a laminate film of polyethylene (50 μm)-polyethylene telephthalate (50 μm) to thereby produce a sheet type battery (B-101 to 115). The structure of a sheet type battery is schematically illustrated in FIG. 2. A positive electrode sheet 31, a high polymer solid electrolyte 32, a negative positive sheet 33, a positive electrode terminal 34, and a negative electrode terminal 35 were structured in such an arrangement as shown in FIG. 2 to produce a sheet type battery (B-101 to 115). Moreover, the structure of RE-3 in table 4 which was used for examples or for comparative examples will be described hereinafter.

TABLE 4

| | Composition of electrolytes | | | |
|---|---|---|---|---|
| Nos. of electrolyte | composition (mass %) | polymerization treatment | Nos. of battery | remarks |
| E-201 | RE-3(30)/PC(30)/EC(40) | not applied | B-101 | comparative example |
| E-202 | RE-3(30)/RE-1(70) | not applied | B-102 | comparative example |
| E-203 | RE-3(30)/RE-1(60)/RE-2(8)/DMAIB(2) | 80° C. and 1 hour | B-103 | comparative example |
| E-204 | exemplary compound F-1(30)/RE-1(70) | not applied | B-104 | present invention |

TABLE 4-continued

| | Composition of electrolytes | | | |
|---|---|---|---|---|
| Nos. of electrolyte | composition (mass %) | polymerization treatment | Nos. of battery | remarks |
| E-205 | RE-3(30)/exemplary compound F-2(70) | not applied | B-105 | present invention |
| E-206 | exemplary compound F-4(30)/exemplary compound F-5(70) | not applied | B-106 | present invention |
| E-207 | exemplary compound F-4(50)/exemplary compound F-5(50) | not applied | B-107 | present invention |
| E-208 | exemplary compound F-4(100) | not applied | B-108 | present invention |
| E-209 | exemplary compound F-7(50)/exemplary compound F-8(50) | not applied | B-109 | present invention |
| E-210 | exemplary compound F-9(50)/exemplary compound F-10(50) | not applied | B-110 | present invention |
| E-211 | exemplary compound F-13(50)/exemplary compound F-14(50) | not applied | B-111 | present invention |
| E-212 | exemplary compound F-23(50)/exemplary compound F-24(50) | not applied | B-112 | present invention |
| E-213 | exemplary compound F-31(50)/exemplary compound F-32(48)/DMAIB(2) | 80° C. and 1 hour | B-113 | present invention |
| E-214 | exemplary compound F-31(50)/exemplary compound F-7(48)/DMAIB(2) | 80° C. and 1 hour | B-114 | present invention |
| E-215 | exemplary compound F-7(50)/exemplary compound F-8 (38)/exemplary compound F-32 (10)/DMAIB(2) | 80° C. and 1 hour | B-115 | present invention |

PC: propylene carbonate
EC: ethylene carbonate

RE-3

$$Li^{\oplus} \ {}^{\ominus}N(SO_2CF_3)_2$$

3-4. Evaluation of Battery Performance

Electric charge/discharge was repeated for 10 times on the sheet type batteries which were produced in such a manner as described above under the conditions that a current density is 1.3 mA/cm$^2$, a final charge voltage is 4.2 V, and a final discharge voltage is 2.6 V. Accordingly, the electric discharge capacity at the 10th cycle was determined. Electric discharge capacity was studied for five batteries formed in the same manner, and the average of the electric discharge capacities was regarded as the capacity of each battery. Thus, the capacity for each battery was determined, whereby a relative capacity with respect to SB-1 was determined. Further, the electric discharge capacity at the 200th cycle for each battery was determined, and a proportion with respect to the electric discharge capacity at the tenth cycle was calculated, and the results were expressed as cycle capacities. Each value is shown in Table 5.

TABLE 5

| | Battery Performance | | |
|---|---|---|---|
| Nos. of battery | relative volume | cycle capacity | remarks |
| B-101 | 1 | 0.58 | comparative example |
| B-102 | 0.60 | 0.91 | comparative example |
| B-103 | 0.48 | 0.92 | comparative example |
| B-104 | 0.98 | 0.94 | present invention |
| B-105 | 1.00 | 0.94 | present invention |
| B-106 | 0.97 | 0.93 | present invention |
| B-107 | 0.98 | 0.91 | present invention |
| B-108 | 0.99 | 0.95 | present invention |
| B-109 | 0.99 | 0.94 | present invention |
| B-110 | 1.03 | 0.93 | present invention |
| B-111 | 1.00 | 0.92 | present invention |
| B-112 | 0.98 | 0.91 | present invention |
| B-113 | 0.96 | 0.97 | present invention |

TABLE 5-continued

| Nos. of battery | Battery Performance | | remarks |
|---|---|---|---|
| | relative volume | cycle capacity | |
| B-114 | 0.95 | 0.98 | present invention |
| B-115 | 0.95 | 0.98 | present invention |

The above-described results revealed that the exemplary sheet type battery using the electrolyte composition of the present invention has improved cycle performance while minimizing the deterioration of a battery capacity.

The present invention can provide an electrolyte composition which does not substantially volatilize and which is excellent in charge transport performance. By using this, the present invention can provide an electrochemical battery in which deterioration of the charge transport performance with passage of time is minimized and which is excellent in durability. More particularly, the present invention can provide a photoelectric chemical battery which is excellent in photoelectric conversion characteristics and in which deterioration of the characteristics with time is minimized, and a non-aqueous secondary battery in which a battery capacity does not deteriorate and which is excellent in cyclic characteristics.

What is claimed is:

1. An electrolyte composition that includes a salt therein, the salt comprising:

an anion which contains a mesogen group and an alkyl or alkenyl group having 6 carbons or more in the structure thereof; and an organic or inorganic cation.

2. An electrolyte composition according to claim 1, wherein the mesogen group is represented by the following formula (1):

(1)

wherein $Y_{11}$ represents a bivalent 4 to 7-membered ring group or a condensed ring group formed thereof, $Q_{12}$ and $Q_{13}$ independently represent a bivalent linking group or a single bond, n represents 1, 2 or 3, and when n is 2 or 3, a plurality of $Y_{11}$, $Q_{12}$, and $Q_{13}$ respectively may be the same or different.

3. An electrolyte composition according to claim 1, wherein the mesogen group is represented by the following formula (1):

(1)

wherein $Y_{11}$ represents a bivalent 4 to 7-membered ring group or a condensed ring group formed thereof, each of $Q_{12}$ and $Q_{13}$ represents a bivalent linking group or a single bond, n represents 1, 2 or 3, and when n is 2 or 3, a plurality of $Y_{11}$, $Q_{12}$, and $Q_{13}$ respectively may be the same or different, and said salt is represented by the following formula (2):

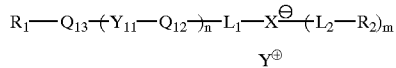

(2)

wherein $Y_{11}$ represents a bivalent 4 to 7-membered ring group, or a condensed ring group formed thereof, $Q_{12}$ and $Q_{13}$ independently represent a bivalent linking group or a single bond, n represents 1, 2 or 3, and when n is 2 or 3, a plurality of $Y_{11}$ and $Q_{12}$ respectively may be the same or different; $R_1$ represents a substituted or unsubstituted alkyl or alkenyl group having 6 carbons or more, $L_1$ and $L_2$ independently represent a bivalent linking group or a direct bond, $R_2$ represents a substituent group, m represents 0 or 1, $X^-$ represents an anionic group, and $Y^+$ represents an organic or inorganic cation.

4. An electrolyte composition according to claim 1, wherein said cation is an organic cation.

5. An electrolyte composition according to claim 1, wherein said cation is a lithium cation.

6. An electrolyte composition according to claim 1, wherein said anion includes an anionic group in which hydrogen is dissociated from at least one selected from groups such as a sulfonamide group, a disulfonimide group, an N-acylsulfonamide group, a carboxylic acid group, a sulfonic acid group, a hydroxyl group, an active methylene group, and an active methine group.

7. An electrolyte composition according to claim 1, wherein at least one of said anion and said cation includes in the structure thereof a group represented by the following formula (3):

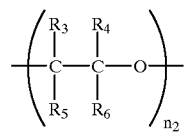

(3)

wherein $R_3$, $R_4$, $R_5$, and $R_6$ independently represent a hydrogen atom or a substituted or unsubstituted alkyl group, and $n_2$ represents any integer from 1 to 20.

8. An electrolyte composition according to claim 1, wherein at least one of said anion and said cation includes a polymerizable group in the structure thereof.

9. The electrolyte composition according to claim 1, wherein at least one of said anion and said cation is a high polymer.

10. The electrolyte composition according to claim 1, which includes therein an iodine salt compound and iodine.

11. An electrolyte composition according to claim 1 that includes further a salt therein, the salt comprising:

an cation which contains a mesogen group and an alkyl or alkenyl group having 6 carbons or more in the structure thereof; and a freely selected anion.

12. An electrochemical battery which includes therein said electrolyte composition according to claim 1.

13. The electrochemical battery according to claim 12, which is a photoelectric chemical battery that comprises:

a charge transport layer which includes said electrolyte composition;

a photosensitive layer which includes a dye-sensitized semiconductor; and a counter electrode.

14. The electrochemical battery according to claim 12, which is a non-aqueous secondary battery.

* * * * *